US009686532B2

(12) United States Patent
Tohme

(10) Patent No.: US 9,686,532 B2
(45) Date of Patent: Jun. 20, 2017

(54) SYSTEM AND METHOD OF ACQUIRING THREE-DIMENSIONAL COORDINATES USING MULTIPLE COORDINATE MEASUREMENT DEVICES

(71) Applicant: FARO Technologies, Inc., Lake Mary, FL (US)

(72) Inventor: Yazid Tohme, Sanford, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 183 days.

(21) Appl. No.: 14/044,311

(22) Filed: Oct. 2, 2013

(65) Prior Publication Data

US 2014/0028805 A1    Jan. 30, 2014

Related U.S. Application Data

(63) Continuation-in-part of application No. 13/443,946, filed on Apr. 11, 2012.
(Continued)

(51) Int. Cl.
*H04N 13/02* (2006.01)
*G01B 11/245* (2006.01)
(Continued)

(52) U.S. Cl.
CPC ....... *H04N 13/0253* (2013.01); *G01B 11/245* (2013.01); *G01B 11/2513* (2013.01);
(Continued)

(58) Field of Classification Search
CPC ........... H04N 13/0239; H04N 13/0055; H04N 13/0296; H04N 13/0497; H04N 13/0242;
(Continued)

(56) References Cited

U.S. PATENT DOCUMENTS 2,612,994 A   10/1952  Woodland
2,682,804 A    7/1954  Clifford et al.
(Continued)

FOREIGN PATENT DOCUMENTS

CA       2811444        3/2012
CH       589856 A5      7/1977
(Continued)

OTHER PUBLICATIONS

"A New Generation of Total Stations from Leica Geosystems." K. Zeiske. Leica Geosystems AG, May 1999, 8 pages.
(Continued)

*Primary Examiner* — Nam Pham
(74) *Attorney, Agent, or Firm* — Cantor Colburn LLP

(57) ABSTRACT

A method is provided of determining three-dimensional coordinates of an object surface with a laser tracker and structured light scanner. The method includes providing the scanner having a body, a pair of cameras, a projector, and a processor. The projector and cameras are positioned in a non-collinear arrangement. The projector is configured to project a first pattern onto the surface. The method also includes providing the tracker which emits a beam of light onto the retroreflector. The tracker receives a reflected beam of light. The first location is measured with the tracker. The first orientation is measured with the tracker. The first surface pattern is projected onto the surface. A pair of images of the surface pattern is acquired with cameras. The processor determines the 3D coordinates of a first plurality of points in the tracker frame of reference based in part on epipolar constraints of the cameras and projector.

8 Claims, 6 Drawing Sheets

Related U.S. Application Data

(60) Provisional application No. 61/475,703, filed on Apr. 15, 2011, provisional application No. 61/592,049, filed on Jan. 30, 2012.

(51) Int. Cl.
*G01B 11/25* (2006.01)
*G01C 15/00* (2006.01)
*G01S 7/48* (2006.01)
*G01S 7/481* (2006.01)
*G01S 7/491* (2006.01)
*G01S 17/42* (2006.01)
*G01S 17/66* (2006.01)
*G01S 17/89* (2006.01)

(52) U.S. Cl.
CPC ...... *G01B 11/2518* (2013.01); *G01B 11/2545* (2013.01); *G01C 15/002* (2013.01); *G01S 7/4808* (2013.01); *G01S 7/4813* (2013.01); *G01S 7/4818* (2013.01); *G01S 7/491* (2013.01); *G01S 17/42* (2013.01); *G01S 17/66* (2013.01); *G01S 17/89* (2013.01)

(58) Field of Classification Search
CPC ...... H04N 7/18; G01B 11/022; G01B 11/024; G01C 15/00
See application file for complete search history.

(56) References Cited

U.S. PATENT DOCUMENTS

| | | |
|---|---|---|
| 2,484,641 A | 3/1957 | Keuffel et al. |
| 2,784,641 A | 3/1957 | Keuffel et al. |
| 3,339,457 A | 9/1967 | Pun |
| 3,365,717 A | 1/1968 | Holscher |
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,178,515 A | 12/1979 | Tarasevich |
| 4,297,030 A | 10/1981 | Chaborski |
| 4,403,857 A | 9/1983 | Holscher |
| 4,413,907 A | 11/1983 | Lane |
| 4,453,825 A | 6/1984 | Buck et al. |
| 4,498,764 A | 2/1985 | Bolkow et al. |
| 4,521,107 A | 6/1985 | Chaborski et al. |
| 4,531,833 A | 7/1985 | Ohtomo |
| 4,537,475 A | 8/1985 | Summers et al. |
| 4,560,270 A | 12/1985 | Wiklund et al. |
| 4,632,547 A | 12/1986 | Kaplan et al. |
| 4,652,130 A | 3/1987 | Tank |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,731,812 A | 3/1988 | Akerberg |
| 4,731,879 A | 3/1988 | Sepp et al. |
| 4,767,257 A | 8/1988 | Kato |
| 4,777,660 A | 10/1988 | Gould et al. |
| 4,790,651 A | 12/1988 | Brown et al. |
| 4,839,507 A | 6/1989 | May |
| 4,983,021 A | 1/1991 | Fergason |
| 5,002,388 A | 3/1991 | Ohishi et al. |
| 5,051,934 A | 9/1991 | Wiklund |
| 5,069,524 A | 12/1991 | Watanabe et al. |
| 5,082,364 A | 1/1992 | Russell |
| 5,090,131 A | 2/1992 | Deer |
| 5,121,242 A | 6/1992 | Kennedy |
| 5,137,354 A | 8/1992 | Devos et al. |
| 5,138,154 A | 8/1992 | Hotelling |
| 5,162,862 A | 11/1992 | Bartram et al. |
| 5,198,868 A | 3/1993 | Saito et al. |
| 5,237,384 A | 8/1993 | Fukunaga et al. |
| 5,263,103 A | 11/1993 | Kosinski |
| 5,267,014 A | 11/1993 | Prenninger |
| 5,301,005 A | 4/1994 | Devos et al. |
| 5,313,409 A | 5/1994 | Wiklund et al. |
| 5,319,434 A | 6/1994 | Croteau et al. |
| 5,347,306 A | 9/1994 | Nitta |
| 5,392,521 A | 2/1995 | Allen |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,440,326 A | 8/1995 | Quinn |
| 5,448,505 A | 9/1995 | Novak |
| 5,455,670 A | 10/1995 | Payne et al. |
| 5,500,737 A | 3/1996 | Donaldson et al. |
| 5,532,816 A | 7/1996 | Spann et al. |
| 5,534,992 A | 7/1996 | Takeshima et al. |
| 5,594,169 A | 1/1997 | Field et al. |
| D378,751 S | 4/1997 | Smith |
| 5,671,160 A | 9/1997 | Julian |
| 5,698,784 A | 12/1997 | Hotelling et al. |
| 5,724,264 A | 3/1998 | Rosenberg et al. |
| 5,737,068 A | 4/1998 | Kaneko et al. |
| 5,742,379 A | 4/1998 | Reifer |
| 5,754,284 A | 5/1998 | Leblanc et al. |
| 5,764,360 A | 6/1998 | Meier |
| 5,767,952 A | 6/1998 | Ohtomo et al. |
| 5,771,623 A | 6/1998 | Pernstich et al. |
| 5,817,243 A | 10/1998 | Shaffer |
| 5,825,350 A | 10/1998 | Case, Jr. et al. |
| 5,828,057 A | 10/1998 | Hertzman et al. |
| 5,861,956 A | 1/1999 | Bridges et al. |
| 5,880,822 A | 3/1999 | Kubo |
| 5,886,775 A | 3/1999 | Houser et al. |
| 5,886,777 A | 3/1999 | Hirunuma |
| 5,892,575 A | 4/1999 | Marino |
| 5,893,214 A | 4/1999 | Meier et al. |
| 5,898,421 A | 4/1999 | Quinn |
| 5,926,388 A | 7/1999 | Kimbrough et al. |
| 5,930,030 A | 7/1999 | Scifres |
| 5,957,559 A | 9/1999 | Rueb et al. |
| 5,973,788 A | 10/1999 | Pettersen et al. |
| 5,991,011 A | 11/1999 | Damm |
| 6,017,125 A | 1/2000 | Vann |
| 6,023,326 A | 2/2000 | Katayama et al. |
| 6,034,722 A | 3/2000 | Viney et al. |
| 6,036,319 A | 3/2000 | Rueb et al. |
| 6,052,190 A | 4/2000 | Sekowski et al. |
| D427,087 S | 6/2000 | Kaneko et al. |
| 6,085,155 A | 7/2000 | Hayase et al. |
| 6,097,491 A | 8/2000 | Hartrumpf |
| 6,097,897 A | 8/2000 | Ide |
| 6,100,540 A | 8/2000 | Ducharme et al. |
| 6,111,563 A | 8/2000 | Hines |
| 6,122,058 A | 9/2000 | Van Der Werf et al. |
| 6,133,998 A | 10/2000 | Monz et al. |
| 6,166,809 A | 12/2000 | Pettersen et al. |
| 6,171,018 B1 | 1/2001 | Ohtomo et al. |
| 6,193,371 B1 | 2/2001 | Snook |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,317,954 B1 | 11/2001 | Cunningham et al. |
| 6,324,024 B1 | 11/2001 | Shirai et al. |
| 6,330,379 B1 | 12/2001 | Hendriksen |
| 6,344,846 B1 | 2/2002 | Hines |
| 6,347,290 B1 | 2/2002 | Bartlett |
| 6,351,483 B1 | 2/2002 | Chen |
| 6,353,764 B1 | 3/2002 | Imagawa et al. |

(56) References Cited

U.S. PATENT DOCUMENTS

| | | |
|---|---|---|
| 6,369,794 B1 | 4/2002 | Sakurai et al. |
| 6,369,880 B1 | 4/2002 | Steinlechner |
| 6,433,866 B1 | 8/2002 | Nichols |
| 6,437,859 B1 | 8/2002 | Ohtomo et al. |
| 6,445,446 B1 | 9/2002 | Kumagai et al. |
| 6,462,810 B1 | 10/2002 | Muraoka et al. |
| 6,463,393 B1 | 10/2002 | Giger |
| 6,490,027 B1 | 12/2002 | Rajchel et al. |
| 6,501,543 B2 | 12/2002 | Hedges et al. |
| 6,532,060 B1 | 3/2003 | Kindaichi et al. |
| 6,559,931 B2 | 5/2003 | Kawamura et al. |
| 6,563,569 B2 | 5/2003 | Osawa et al. |
| 6,567,101 B1 | 5/2003 | Thomas |
| 6,573,883 B1 | 6/2003 | Bartlett |
| 6,573,981 B2 | 6/2003 | Kumagai et al. |
| 6,583,862 B1 | 6/2003 | Perger |
| 6,587,244 B1 | 7/2003 | Ishinabe et al. |
| 6,611,617 B1 | 8/2003 | Crampton |
| 6,624,916 B1 | 9/2003 | Green et al. |
| 6,630,993 B1 | 10/2003 | Hedges et al. |
| 6,633,367 B2 | 10/2003 | Gogolla |
| 6,646,732 B2 | 11/2003 | Ohtomo et al. |
| 6,650,222 B2 | 11/2003 | Darr |
| 6,667,798 B1 | 12/2003 | Markendorf et al. |
| 6,668,466 B1 | 12/2003 | Bieg et al. |
| 6,678,059 B2 | 1/2004 | Cho et al. |
| 6,681,031 B2 | 1/2004 | Cohen et al. |
| 6,727,984 B2 | 4/2004 | Becht |
| 6,727,985 B2 | 4/2004 | Giger |
| 6,754,370 B1 | 6/2004 | Hall-Holt et al. |
| 6,765,653 B2 | 7/2004 | Shirai et al. |
| 6,802,133 B2 | 10/2004 | Jordil et al. |
| 6,847,436 B2 | 1/2005 | Bridges |
| 6,859,744 B2 | 2/2005 | Giger |
| 6,864,966 B2 | 3/2005 | Giger |
| 6,935,036 B2 | 8/2005 | Raab |
| 6,957,493 B2 | 10/2005 | Kumagai et al. |
| 6,964,113 B2 | 11/2005 | Bridges et al. |
| 6,965,843 B2 | 11/2005 | Raab et al. |
| 6,980,881 B2 | 12/2005 | Greenwood et al. |
| 6,996,912 B2 | 2/2006 | Raab |
| 6,996,914 B1 | 2/2006 | Istre et al. |
| 7,022,971 B2 | 4/2006 | Ura et al. |
| 7,023,531 B2 | 4/2006 | Gogolla et al. |
| 7,055,253 B2 | 6/2006 | Kaneko |
| 7,072,032 B2 | 7/2006 | Kumagai et al. |
| 7,086,169 B1 | 8/2006 | Bayham et al. |
| 7,095,490 B2 | 8/2006 | Ohtomo et al. |
| 7,099,000 B2 | 8/2006 | Connolly |
| 7,129,927 B2 | 10/2006 | Mattsson |
| 7,130,035 B2 | 10/2006 | Ohtomo et al. |
| 7,168,174 B2 | 1/2007 | Piekutowski |
| 7,177,014 B2 | 2/2007 | Mori et al. |
| 7,193,695 B2 | 3/2007 | Sugiura |
| 7,196,776 B2 | 3/2007 | Ohtomo et al. |
| 7,222,021 B2 | 5/2007 | Ootomo et al. |
| 7,224,444 B2 | 5/2007 | Stierle et al. |
| 7,230,689 B2 | 6/2007 | Lau |
| 7,233,316 B2 | 6/2007 | Smith et al. |
| 7,246,030 B2 | 7/2007 | Raab et al. |
| 7,248,374 B2 | 7/2007 | Bridges |
| 7,253,891 B2 | 8/2007 | Toker et al. |
| 7,256,899 B1 | 8/2007 | Faul et al. |
| 7,262,863 B2 | 8/2007 | Schmidt et al. |
| 7,274,802 B2 | 9/2007 | Kumagai et al. |
| 7,285,793 B2 | 10/2007 | Husted |
| 7,286,246 B2 | 10/2007 | Yoshida |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,325,326 B1 | 2/2008 | Istre et al. |
| 7,327,446 B2 | 2/2008 | Cramer et al. |
| 7,336,346 B2 | 2/2008 | Aoki et al. |
| 7,336,375 B1 | 2/2008 | Faul et al. |
| 7,339,655 B2 | 3/2008 | Nakamura et al. |
| 7,345,748 B2 | 3/2008 | Sugiura et al. |
| 7,352,446 B2 | 4/2008 | Bridges et al. |
| 7,372,558 B2 | 5/2008 | Kaufman et al. |
| 7,388,654 B2 | 6/2008 | Raab et al. |
| 7,388,658 B2 | 6/2008 | Glimm |
| 7,401,783 B2 | 7/2008 | Pryor |
| 7,429,112 B2 | 9/2008 | Metcalfe |
| 7,446,863 B2 | 11/2008 | Nishita et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,503,123 B2 | 3/2009 | Matsuo et al. |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,565,216 B2 | 7/2009 | Soucy |
| 7,583,375 B2 | 9/2009 | Cramer et al. |
| 7,586,586 B2 | 9/2009 | Constantikes |
| 7,613,501 B2 | 11/2009 | Scherch |
| 7,614,019 B2 | 11/2009 | Rimas Ribikauskas et al. |
| D605,959 S | 12/2009 | Apotheloz |
| 7,634,374 B2 | 12/2009 | Chouinard et al. |
| 7,634,381 B2 | 12/2009 | Westermark et al. |
| 7,692,628 B2 | 4/2010 | Smith et al. |
| 7,701,559 B2 | 4/2010 | Bridges et al. |
| 7,701,566 B2 | 4/2010 | Kumagai et al. |
| 7,705,830 B2 | 4/2010 | Westerman et al. |
| 7,710,396 B2 | 5/2010 | Smith et al. |
| 7,724,380 B2 | 5/2010 | Horita et al. |
| 7,728,963 B2 | 6/2010 | Kirschner |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,765,084 B2 | 7/2010 | Westermark et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| 7,876,457 B2 | 1/2011 | Rueb |
| 7,894,079 B1 | 2/2011 | Altendorf et al. |
| 7,903,237 B1 | 3/2011 | Li |
| 7,929,150 B1 | 4/2011 | Schweiger |
| 7,954,250 B2 | 6/2011 | Crampton |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,121 B2 | 1/2012 | Obermeyer et al. |
| 8,094,212 B2 | 1/2012 | Jelinek |
| 8,125,629 B2 | 2/2012 | Dold et al. |
| 8,151,477 B2 | 4/2012 | Tait |
| 8,190,030 B2 | 5/2012 | Leclair et al. |
| 8,217,893 B2 | 7/2012 | Quinn et al. |
| 8,237,934 B1 | 8/2012 | Cooke et al. |
| 8,244,023 B2 | 8/2012 | Yamada |
| 8,279,430 B2 | 10/2012 | Dold et al. |
| 8,314,939 B2 | 11/2012 | Kato |
| 8,320,708 B2 | 11/2012 | Kurzweil et al. |
| 8,360,240 B2 | 1/2013 | Kallabis |
| 8,379,224 B1 | 2/2013 | Piasse et al. |
| 8,387,961 B2 | 3/2013 | Im |
| 8,405,604 B2 | 3/2013 | Pryor et al. |
| 8,422,034 B2 | 4/2013 | Steffensen et al. |
| 8,437,011 B2 | 5/2013 | Steffensen et al. |
| 8,438,747 B2 | 5/2013 | Ferrari |
| 8,467,071 B2 | 6/2013 | Steffey et al. |
| 8,467,072 B2 | 6/2013 | Cramer et al. |

(56) References Cited

U.S. PATENT DOCUMENTS

| | | |
|---|---|---|
| 8,483,512 B2 | 7/2013 | Moeller |
| 8,509,949 B2 | 8/2013 | Bordyn et al. |
| 8,525,983 B2 | 9/2013 | Bridges et al. |
| 8,537,371 B2 | 9/2013 | Steffensen et al. |
| 8,537,375 B2 | 9/2013 | Steffensen et al. |
| 8,553,212 B2 | 10/2013 | Jaeger et al. |
| 8,593,648 B2 | 11/2013 | Cramer et al. |
| 8,619,265 B2 | 12/2013 | Steffey et al. |
| 8,630,314 B2 | 1/2014 | York |
| 8,638,984 B2 | 1/2014 | Roithmeier |
| 8,654,354 B2 | 2/2014 | Steffensen et al. |
| 8,659,749 B2 | 2/2014 | Bridges |
| 8,670,114 B2 | 3/2014 | Bridges et al. |
| 8,681,317 B2 | 3/2014 | Moser et al. |
| 8,699,756 B2 | 4/2014 | Jensen |
| 8,717,545 B2 | 5/2014 | Sebastian et al. |
| 8,740,396 B2 | 6/2014 | Brown et al. |
| 8,772,719 B2 | 7/2014 | Böokem et al. |
| 8,773,667 B2 | 7/2014 | Edmonds et al. |
| 8,848,203 B2 | 9/2014 | Bridges et al. |
| 8,874,406 B2 | 10/2014 | Rotvold et al. |
| 8,902,408 B2 | 12/2014 | Bridges |
| 8,931,183 B2 | 1/2015 | Jonas |
| 9,151,830 B2 | 10/2015 | Bridges |
| 9,207,309 B2 | 12/2015 | Bridges |
| 9,377,885 B2 | 6/2016 | Bridges et al. |
| 2001/0045534 A1 | 11/2001 | Kimura |
| 2002/0033940 A1 | 3/2002 | Hedges et al. |
| 2002/0093646 A1 | 7/2002 | Muraoka |
| 2002/0148133 A1 | 10/2002 | Bridges et al. |
| 2002/0179866 A1 | 12/2002 | Hoeller et al. |
| 2003/0014212 A1 | 1/2003 | Ralston et al. |
| 2003/0033041 A1 | 2/2003 | Richey |
| 2003/0035195 A1 | 2/2003 | Blech et al. |
| 2003/0048459 A1 | 3/2003 | Gooch |
| 2003/0090682 A1 | 5/2003 | Gooch et al. |
| 2003/0112449 A1 | 6/2003 | Tu et al. |
| 2003/0125901 A1 | 7/2003 | Steffey et al. |
| 2003/0133092 A1 | 7/2003 | Rogers |
| 2003/0179362 A1* | 9/2003 | Osawa et al. .............. 356/4.09 |
| 2003/0206285 A1 | 11/2003 | Lau |
| 2003/0227616 A1 | 12/2003 | Bridges |
| 2004/0035277 A1 | 2/2004 | Hubbs |
| 2004/0041996 A1 | 3/2004 | Abe |
| 2004/0075823 A1 | 4/2004 | Lewis et al. |
| 2004/0100705 A1 | 5/2004 | Hubbs |
| 2004/0170363 A1 | 9/2004 | Angela |
| 2004/0189944 A1 | 9/2004 | Kaufman et al. |
| 2004/0218104 A1 | 11/2004 | Smith et al. |
| 2004/0223139 A1 | 11/2004 | Vogel |
| 2005/0058179 A1 | 3/2005 | Phipps |
| 2005/0147477 A1 | 7/2005 | Clark |
| 2005/0179890 A1 | 8/2005 | Cramer et al. |
| 2005/0185182 A1 | 8/2005 | Raab et al. |
| 2005/0197145 A1 | 9/2005 | Chae et al. |
| 2005/0254043 A1 | 11/2005 | Chiba |
| 2005/0284937 A1 | 12/2005 | Xi et al. |
| 2006/0009929 A1 | 1/2006 | Boyette et al. |
| 2006/0053647 A1 | 3/2006 | Raab et al. |
| 2006/0055662 A1 | 3/2006 | Rimas-Ribikauskas et al. |
| 2006/0055685 A1 | 3/2006 | Rimas-Ribikauskas et al. |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0140473 A1 | 6/2006 | Brooksby et al. |
| 2006/0141435 A1 | 6/2006 | Chiang |
| 2006/0145703 A1 | 7/2006 | Steinbichler et al. |
| 2006/0146009 A1 | 7/2006 | Syrbe et al. |
| 2006/0161379 A1 | 7/2006 | Ellenby et al. |
| 2006/0164384 A1 | 7/2006 | Smith et al. |
| 2006/0164385 A1 | 7/2006 | Smith et al. |
| 2006/0164386 A1 | 7/2006 | Smith et al. |
| 2006/0222237 A1 | 10/2006 | Du et al. |
| 2006/0222314 A1 | 10/2006 | Zumbrunn et al. |
| 2006/0235611 A1 | 10/2006 | Deaton et al. |
| 2006/0262001 A1 | 11/2006 | Ouchi et al. |
| 2006/0279246 A1 | 12/2006 | Hashimoto et al. |
| 2007/0016386 A1 | 1/2007 | Husted |
| 2007/0019212 A1 | 1/2007 | Gatsios et al. |
| 2007/0024842 A1 | 2/2007 | Nishizawa et al. |
| 2007/0090309 A1 | 4/2007 | Hu et al. |
| 2007/0121095 A1 | 5/2007 | Lewis |
| 2007/0127013 A1 | 6/2007 | Hertzman et al. |
| 2007/0130785 A1 | 6/2007 | Bublitz et al. |
| 2007/0236452 A1 | 10/2007 | Venkatesh et al. |
| 2007/0247615 A1 | 10/2007 | Bridges et al. |
| 2007/0285672 A1 | 12/2007 | Mukai et al. |
| 2008/0002866 A1 | 1/2008 | Fujiwara |
| 2008/0024795 A1 | 1/2008 | Yamamoto et al. |
| 2008/0043409 A1 | 2/2008 | Kallabis |
| 2008/0107305 A1 | 5/2008 | Vanderkooy et al. |
| 2008/0122786 A1 | 5/2008 | Pryor et al. |
| 2008/0203299 A1 | 8/2008 | Kozuma et al. |
| 2008/0229592 A1 | 9/2008 | Hinderling et al. |
| 2008/0239281 A1 | 10/2008 | Bridges |
| 2008/0246974 A1 | 10/2008 | Wilson et al. |
| 2008/0250659 A1 | 10/2008 | Bellerose et al. |
| 2008/0279446 A1 | 11/2008 | Hassebrook et al. |
| 2008/0297808 A1 | 12/2008 | Riza et al. |
| 2008/0302200 A1 | 12/2008 | Tobey |
| 2008/0309949 A1 | 12/2008 | Rueb |
| 2008/0316497 A1 | 12/2008 | Taketomi et al. |
| 2008/0316503 A1 | 12/2008 | Smarsh et al. |
| 2009/0000136 A1 | 1/2009 | Crampton |
| 2009/0009747 A1 | 1/2009 | Wolf et al. |
| 2009/0033621 A1 | 2/2009 | Quinn et al. |
| 2009/0046271 A1 | 2/2009 | Constantikes |
| 2009/0066932 A1 | 3/2009 | Bridges et al. |
| 2009/0109426 A1 | 4/2009 | Cramer et al. |
| 2009/0153817 A1 | 6/2009 | Kawakubo |
| 2009/0157226 A1 | 6/2009 | De Smet |
| 2009/0171618 A1 | 7/2009 | Kumagai et al. |
| 2009/0187373 A1 | 7/2009 | Atwell et al. |
| 2009/0190125 A1 | 7/2009 | Foster et al. |
| 2009/0205088 A1 | 8/2009 | Crampton et al. |
| 2009/0213073 A1 | 8/2009 | Obermeyer et al. |
| 2009/0239581 A1 | 9/2009 | Lee |
| 2009/0240372 A1 | 9/2009 | Bordyn et al. |
| 2009/0240461 A1 | 9/2009 | Makino et al. |
| 2009/0240462 A1 | 9/2009 | Lee |
| 2009/0244277 A1 | 10/2009 | Nagashima et al. |
| 2009/0260240 A1 | 10/2009 | Bernhard |
| 2010/0008543 A1 | 1/2010 | Yamada et al. |
| 2010/0025746 A1 | 2/2010 | Chapman et al. |
| 2010/0058252 A1 | 3/2010 | Ko |
| 2010/0091112 A1 | 4/2010 | Veeser et al. |
| 2010/0103431 A1 | 4/2010 | Demopoulos |
| 2010/0128259 A1 | 5/2010 | Bridges et al. |
| 2010/0142798 A1 | 6/2010 | Weston et al. |
| 2010/0149518 A1 | 6/2010 | Nordenfelt et al. |
| 2010/0149525 A1* | 6/2010 | Lau ........................ 356/139.03 |
| 2010/0158361 A1 | 6/2010 | Grafinger et al. |
| 2010/0176270 A1 | 7/2010 | Lau et al. |
| 2010/0207938 A1 | 8/2010 | Yau et al. |
| 2010/0225746 A1 | 9/2010 | Shpunt et al. |
| 2010/0234094 A1 | 9/2010 | Gagner et al. |
| 2010/0235786 A1 | 9/2010 | Maizels et al. |
| 2010/0245851 A1 | 9/2010 | Teodorescu |
| 2010/0250175 A1 | 9/2010 | Briggs et al. |
| 2010/0250188 A1 | 9/2010 | Brown |
| 2010/0251148 A1 | 9/2010 | Brown |
| 2010/0265316 A1 | 10/2010 | Sali et al. |
| 2010/0277747 A1 | 11/2010 | Rueb et al. |
| 2010/0284082 A1 | 11/2010 | Shpunt et al. |
| 2010/0299103 A1 | 11/2010 | Yoshikawa |
| 2011/0001958 A1 | 1/2011 | Bridges et al. |
| 2011/0003507 A1 | 1/2011 | Van Swearingen et al. |
| 2011/0007154 A1 | 1/2011 | Vogel et al. |
| 2011/0013281 A1 | 1/2011 | Mimura et al. |
| 2011/0023578 A1 | 2/2011 | Grasser |
| 2011/0025827 A1 | 2/2011 | Shpunt et al. |
| 2011/0032509 A1 | 2/2011 | Bridges et al. |
| 2011/0035952 A1 | 2/2011 | Roithmeier |
| 2011/0043620 A1 | 2/2011 | Svanholm et al. |

(56) References Cited

U.S. PATENT DOCUMENTS

| | | |
|---|---|---|
| 2011/0043808 A1 | 2/2011 | Isozaki et al. |
| 2011/0052006 A1 | 3/2011 | Gurman et al. |
| 2011/0069322 A1 | 3/2011 | Hoffer, Jr. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0109502 A1 | 5/2011 | Sullivan |
| 2011/0112786 A1 | 5/2011 | Desforges et al. |
| 2011/0123097 A1 | 5/2011 | Van Coppenolle et al. |
| 2011/0128625 A1 | 6/2011 | Larsen et al. |
| 2011/0166824 A1 | 7/2011 | Haisty et al. |
| 2011/0169924 A1 | 7/2011 | Haisty et al. |
| 2011/0170534 A1 | 7/2011 | York |
| 2011/0173827 A1 | 7/2011 | Bailey et al. |
| 2011/0175745 A1 | 7/2011 | Atwell et al. |
| 2011/0176145 A1 | 7/2011 | Edmonds et al. |
| 2011/0179281 A1 | 7/2011 | Chevallier-Mames et al. |
| 2011/0181872 A1 | 7/2011 | Dold et al. |
| 2011/0260033 A1 | 10/2011 | Steffensen et al. |
| 2011/0301902 A1 | 12/2011 | Panagas et al. |
| 2012/0050255 A1 | 3/2012 | Thomas et al. |
| 2012/0062706 A1 | 3/2012 | Keshavmurthy et al. |
| 2012/0065928 A1 | 3/2012 | Rotvold et al. |
| 2012/0099117 A1 | 4/2012 | Hanchett et al. |
| 2012/0105821 A1 | 5/2012 | Moser et al. |
| 2012/0120391 A1 | 5/2012 | Dold et al. |
| 2012/0120415 A1 | 5/2012 | Steffensen et al. |
| 2012/0124850 A1 | 5/2012 | Ortleb et al. |
| 2012/0154577 A1 | 6/2012 | Yoshikawa et al. |
| 2012/0188559 A1 | 7/2012 | Becker et al. |
| 2012/0206716 A1 | 8/2012 | Cramer et al. |
| 2012/0206808 A1 | 8/2012 | Brown et al. |
| 2012/0218563 A1* | 8/2012 | Spruck et al. ............ 356/612 |
| 2012/0236320 A1 | 9/2012 | Steffey et al. |
| 2012/0242795 A1 | 9/2012 | Kane et al. |
| 2012/0262550 A1 | 10/2012 | Bridges |
| 2012/0262573 A1 | 10/2012 | Bridges et al. |
| 2012/0262728 A1 | 10/2012 | Bridges et al. |
| 2012/0265479 A1 | 10/2012 | Bridges et al. |
| 2012/0317826 A1 | 12/2012 | Jonas |
| 2013/0037694 A1 | 2/2013 | Steffensen et al. |
| 2013/0096873 A1 | 4/2013 | Rosengaus et al. |
| 2013/0100282 A1 | 4/2013 | Siercks et al. |
| 2013/0128284 A1 | 5/2013 | Steffey et al. |
| 2013/0155386 A1 | 6/2013 | Bridges et al. |
| 2013/0162469 A1 | 6/2013 | Zogg et al. |
| 2013/0197852 A1 | 8/2013 | Grau et al. |
| 2013/0201470 A1 | 8/2013 | Cramer et al. |
| 2013/0293684 A1 | 11/2013 | Becker et al. |
| 2014/0002806 A1 | 1/2014 | Buchel et al. |
| 2014/0028805 A1 | 1/2014 | Tohme et al. |
| 2014/0267629 A1 | 9/2014 | Tohme et al. |
| 2014/0320643 A1 | 10/2014 | Markendorf |
| 2014/0327920 A1 | 11/2014 | Bridges et al. |
| 2015/0049329 A1 | 2/2015 | Bridges et al. |
| 2015/0331159 A1 | 11/2015 | Bridges et al. |
| 2015/0365653 A1 | 12/2015 | Tohme et al. |
| 2015/0373321 A1 | 12/2015 | Bridges |

FOREIGN PATENT DOCUMENTS

| | | |
|---|---|---|
| CN | 1263807 A | 8/2000 |
| CN | 1290850 | 4/2001 |
| CN | 1362692 A | 8/2002 |
| CN | 1474159 A | 2/2004 |
| CN | 1531659 A | 9/2004 |
| CN | 1608212 A | 4/2005 |
| CN | 1926400 A | 3/2007 |
| CN | 101031817 A | 9/2007 |
| CN | 101203730 A | 6/2008 |
| CN | 101297176 A | 10/2008 |
| CN | 101371160 A | 2/2009 |
| CN | 101427155 A | 5/2009 |
| CN | 101750012 A | 6/2010 |
| CN | 101776982 A | 7/2010 |
| CN | 201548192 U | 8/2010 |
| DE | 7704949 U1 | 6/1977 |
| DE | 3530922 A1 | 4/1986 |
| DE | 3827458 A1 | 2/1990 |
| DE | 10022054 A1 | 11/2001 |
| DE | 10160090 A1 | 7/2002 |
| DE | 202004004945 U1 | 10/2004 |
| DE | 102004024171 A1 | 9/2005 |
| DE | 102005019058 A1 | 12/2005 |
| DE | 102006013185 A1 | 9/2007 |
| DE | 202006020299 U1 | 5/2008 |
| DE | 60319016 | 4/2009 |
| DE | 102007058692 A1 | 6/2009 |
| DE | 102009040837 A1 | 3/2011 |
| EP | 0166106 | 1/1986 |
| EP | 0598523 A1 | 5/1994 |
| EP | 598523 A1 | 5/1994 |
| EP | 0797076 A2 | 9/1997 |
| EP | 0919831 A2 | 6/1999 |
| EP | 0957336 A2 | 11/1999 |
| EP | 1067363 A2 | 1/2001 |
| EP | 1519141 | 3/2005 |
| EP | 1607767 A1 | 12/2005 |
| EP | 1710602 B1 | 10/2006 |
| EP | 2136178 A1 | 12/2009 |
| EP | 2177868 A2 | 4/2010 |
| EP | 2219011 A1 | 8/2010 |
| EP | 2259010 A1 | 12/2010 |
| EP | 2259013 A1 | 12/2010 |
| EP | 2322901 A2 | 5/2011 |
| EP | 2446300 A1 | 5/2012 |
| GB | 1543636 | 4/1979 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | S57147800 | 9/1982 |
| JP | S6097288 A | 5/1985 |
| JP | 2184788 A1 | 7/1990 |
| JP | H0331715 A | 2/1991 |
| JP | H0371116 A | 3/1991 |
| JP | H0465631 A | 3/1992 |
| JP | H05257005 | 10/1993 |
| JP | H05302976 A | 11/1993 |
| JP | H6097288 | 4/1994 |
| JP | H06229715 A | 8/1994 |
| JP | H0665818 | 9/1994 |
| JP | H06265355 A | 9/1994 |
| JP | H074967 A | 1/1995 |
| JP | H08145679 A | 6/1996 |
| JP | H0914965 A | 1/1997 |
| JP | H102722 A | 1/1998 |
| JP | H10107357 A | 4/1998 |
| JP | H10317874 A | 12/1998 |
| JP | 11502629 a | 3/1999 |
| JP | H11304465 A | 11/1999 |
| JP | H11513495 A | 11/1999 |
| JP | H11337642 | 12/1999 |
| JP | 2000503476 A | 3/2000 |
| JP | 2000275042 | 10/2000 |
| JP | 2000346645 A | 12/2000 |
| JP | 2001013247 A | 1/2001 |
| JP | 2001165662 A | 6/2001 |
| JP | 2001513204 A | 8/2001 |
| JP | 2001272468 | 10/2001 |
| JP | 2001284317 A | 10/2001 |
| JP | 2001353112 A | 12/2001 |
| JP | 2002089184 A | 3/2002 |
| JP | 2002098762 A | 4/2002 |
| JP | 2002139310 A | 5/2002 |
| JP | 2002209361 A | 7/2002 |
| JP | 2003506691 A | 2/2003 |
| JP | 2004508954 A | 3/2004 |
| JP | 2004108939 | 4/2004 |
| JP | 2004527751 | 9/2004 |
| JP | 3109969 U | 6/2005 |

(56) References Cited

FOREIGN PATENT DOCUMENTS

| | | |
|---|---|---|
| JP | 2005265700 A | 9/2005 |
| JP | 2006003127 A | 1/2006 |
| JP | 2006058091 A | 3/2006 |
| JP | 2006084460 A | 3/2006 |
| JP | 2006220514 A | 8/2006 |
| JP | 2006276012 A | 10/2006 |
| JP | 2006526844 A | 11/2006 |
| JP | 2007504459 A | 3/2007 |
| JP | 2007165331 A | 6/2007 |
| JP | 2007523357 A | 8/2007 |
| JP | 2007256872 A | 10/2007 |
| JP | 2008027308 A | 2/2008 |
| JP | 2008514967 | 5/2008 |
| JP | 2008544215 A | 12/2008 |
| JP | 2009014639 A | 1/2009 |
| JP | 2009134761 A | 6/2009 |
| JP | 2009229350 A | 10/2009 |
| JP | 2010169633 A | 8/2010 |
| JP | 2011158371 A | 8/2011 |
| JP | 2011526706 A | 10/2011 |
| JP | 2013525787 A | 10/2011 |
| JP | H04504468 A | 10/2011 |
| JP | 2012509464 A | 4/2012 |
| JP | 2012530909 A | 12/2012 |
| JP | 5302976 B2 | 10/2013 |
| TW | 381361 B | 2/2000 |
| WO | 9012284 | 10/1990 |
| WO | 9534849 A1 | 12/1995 |
| WO | 0109642 A1 | 2/2001 |
| WO | 0177613 A1 | 10/2001 |
| WO | 0223121 A1 | 3/2002 |
| WO | 0237466 A1 | 5/2002 |
| WO | 02084327 A2 | 10/2002 |
| WO | 03062744 A1 | 7/2003 |
| WO | 03073121 A1 | 9/2003 |
| WO | 2004063668 | 7/2004 |
| WO | 2005026772 A2 | 3/2005 |
| WO | 2006039682 A1 | 4/2006 |
| WO | 2006052259 A1 | 5/2006 |
| WO | 2006055770 A2 | 5/2006 |
| WO | 2007079601 A1 | 7/2007 |
| WO | 2007084209 | 7/2007 |
| WO | 2007123604 A1 | 11/2007 |
| WO | 2007124010 A2 | 11/2007 |
| WO | 2008052348 A1 | 5/2008 |
| WO | 2008119073 A2 | 10/2008 |
| WO | WO2008121919 A1 | 10/2008 |
| WO | 2010057169 A2 | 5/2010 |
| WO | 2010100043 A1 | 9/2010 |
| WO | 2010107434 A1 | 9/2010 |
| WO | 2010141120 A2 | 12/2010 |
| WO | 2010148525 A1 | 12/2010 |
| WO | 2011035290 | 3/2011 |
| WO | 2011057130 A2 | 5/2011 |
| WO | 2011107729 A1 | 9/2011 |
| WO | 2011112277 A1 | 9/2011 |
| WO | 2012142074 A2 | 10/2012 |
| WO | 2010148526 A1 | 12/2012 |
| WO | 2014143644 A1 | 9/2014 |
| WO | 2014149701 A1 | 9/2014 |
| WO | 2014149704 A1 | 9/2014 |
| WO | 2014149705 A1 | 9/2014 |
| WO | 2014149706 A1 | 9/2014 |
| WO | 2014149702 A1 | 9/2015 |

OTHER PUBLICATIONS

"DLP-Based Structured Light 3D Imaging Technologies and Applications" by J. Geng; Proceedings of SPIE, vol. 7932. Published Feb. 11, 2011, 15 pages.

"Fiber Optic Rotary Joints Product Guide"; Moog Inc; MS1071, rev. 2; p. 1-4; 2010; Retreived on Nov. 13, 2013 from http://www.moog.com/literature/ICD/Moog-Fiber-Optic-Rotary-Joint_Catalog-en.pdf;.

"Technical Brief: Fiber Optic Rotary Joint"; Document No. 303; Moog Inc; p. 1-6; 2008; Retreived on Nov. 13, 2013 from http://www.moog.com/literature/MCG/FORJtechbrief.pdf.

2x2 High Speed Lithium Niobate Interferometric Switch; [on-line]; JDS Uniphase Corporation; 2007; Retreived from www.jdsu.com.

AO Modulator—M040-8J-FxS; [online—technical data sheet]; Gooch & Housego; Nov. 2006; Retreived from http://www.goochandhousego.com/.

Automated Precision, Inc., Product Specifications, Radian, Featuring INNOVO Technology, info@apisensor.com, Copyright 2011, 2 pages.

Cao, et al.; "VisionWand: Interaction Techniques for Large Displays using a Passive Wand Tracked in 3D"; Proceedings of the 16th Annual ACM Symposium on User Interface Software and Technology, UIST; vol. 5, issue 2; pp. 173-182; Jan. 2003.

Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131.

Parker, et al "Instrument for Setting Radio Telescope Surfaces" (4 pp) XP 55055817A.

Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Publication date: Novembe.

Sladek, J., et al: "The Hybrid Contact-Optical Coordinate Measuring System." Measurement, vol. 44, No. 3, Mar. 1, 2011, pp. 503-510.

Stone, et al. "Automated Part Tracking on the Construction Job Site" 8 pp; XP 55055816A; National Institute of Standards and Technology.

Turk, et al., "Perceptual Interfaces", UCSB Technical Report 2003-33, pp. 1-43 [Retrieved Aug. 11, 2011, http://www.cs.ucsb.edu/research/tech_reports/reports/2003-33.pdf] (2003).

Computer Giants Embrace On-Chip Optics; Mar. 27, 2008; [on-line]; Optics.org; [Retreived on Apr. 2, 2008]; Retreived from http://optics.org/cws/article/research/33521.

Cuypers, et al "Optical Measurement Techniques for Mobile and Large-Scale Dimensional Metrology" (2009) ; Optics and Lasers in Engineering pp. 292-300; vol. 47; Elsevier Ltd. XP 25914917A.

English Abstract of CN1362692; Applicant: Univ Tianjin; Published Date: Aug. 7, 2002; 1 pg.

English Abstract of JP2005010585; Applicant: TDK Corp; Published Date: Jan. 13, 2005; 1 pg.

English Abstract of JPH06214186; Applicant: Eastman Kodak Co Ltd; Published Date: Aug. 5, 1994; 1 pg.

English Abstract of JPH09113223; Applicant: Fuji Xerox Co Ltd; Published Date: May 2, 1997; 1 pg.

EOSpace—High-Speed Switches; [on-line technical brochure]; [Retreived May 18, 2009]; Retreived from http://www.cospace.com/Switches.htm.

FARO Laser Tracker ION; 2 pages; revised Apr. 23, 2010; FARO Technologies, Inc., www.lasertracker.faro.com.

FARO Technical Institute, Basic Measurement Training Workbook, Version 1.0, FARO Laster Tracker, Jan. 2008, Students Book, FAO CAM2 Measure.

Hanwei Xiong et al: "The Development of Optical Fringe Measurement System integrated with a CMM for Products Inspection." Proceedings of SPIE, vol. 7855, Nov. 3, 2010, pp. 78551W-7855W-8, XP055118356. ISSN: 0277-786X.

Hecht,Photonic Frontiers:Gesture Recognition: Lasers Bring Gesture Recognition to the Home, Laser Focus World, pp. 1-5, Retrieved on Mar. 3, 2011:http://www.optoiq.com/optoiq-2/en-us/index/photonics-technologies-applications/lfw-display/lfw-display/lfw-arti.

Hui, Elliot E., et al, "Single-Step Assembly of Complex 3-D Microstructures", Jan. 23, 2000, IEEE; pp. 602-607.

Integrated Optical Amplitude Modulator; [on-line technical data sheet]; [Retrieved Oct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open.

(56) References Cited

OTHER PUBLICATIONS

Tracker3; Ultra-Portable Laser Tracking System; 4 pages; 2010 Automated Precision Inc.; www.apisensor.com.
Katowski "Optical 3-D Measurement Techniques-Applications in inspection, quality control and robotic" Vienna, Austria, Sep. 18-20, 1989.
Kester, Walt, Practical Analog Design Techniques, Analog Devices, Section 5, Undersampling Applications, Copyright 1995, pp. 5-1 to 5-34.
Kollorz et al.,"Gesture recognition with a time-of-flight camera",Int. Jo. of Intelligent Sys Tech and Applications,vol. 5, No. 3/4,p. 334-343,Retreived Aug. 11, 2011;http://www5.informatik.uni-erlangen.de/Forschung/Publikationen/2008/Kollorz08-GRW.pdf, 2008.
LaserTRACER-measureing sub-micron in space; http://www.etalon-ag.com/index.php/en/products/lasertracer; 4 pages; Jun. 28, 2011; ETALON AG.
Leica Absolute Tracker AT401-ASME B89.4.19-2006 Specifications; Hexagon Metrology; Leica Geosystems Metrology Products, Switzerland; 2 pages; www.leica-geosystems.com/metrology.
Leica Geosystems AG ED—"Leica Laser Tracker System", Internet Citation, Jun. 28, 2012, XP002678836, Retrieved from the Internet: URL:http://www.a-solution.com.au/pages/downloads/LTD500_Brochure_EN.pdf.
Leica Geosystems Metrology, "Leica Absolute Tracker AT401, White Paper," Hexagon AB; 2010.
Leica Geosystems: "TPS1100 Professional Series", 1999, Retrieved from the Internet: URL:http://www.estig.ibeja.pt/-legvm/top_civil/TPS1100%20-%20A%20New%20Generation%20of%20Total%20Stations.pdf, [Retrieved on Jul. 9, 2012 ] the whole document.
Li, et al., "Real Time Hand Gesture Recognition using a Range Camera", Australasian Conference on Robotics and Automation (ACRA), [Retreived Aug. 10, 2011, http://www.araa.asn.au/acra/acra2009/papers/pap128s1.pdf] pp. 1-7 (2009).
Lightvision—High Speed Variable Optical Attenuators (VOA); [on-line]; A publication of Lightwaves 2020, Feb. 1, 2008; Retrieved from http://www.lightwaves2020.com/home/.
Maekynen, A. J. et al., Tracking Laser Radar for 3-D Shape Measurements of Large Industrial Objects Based on Time-of-Flight Laser Rangefinding and Position-Sensitive Detection Techniques, IEEE Transactions on Instrumentation and Measurement, vol. 43, No.
Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptica.
Matsumaru, K, "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8.
MEMS Variable Optical Attenuators Single/Multi-Channel; [on-line]; Jan. 17, 2005; Retrieved from www.ozoptics.com.
Nanona High Speed & Low Loss Optical Switch; [on-line technical data sheet]; [Retrieved Oct. 14, 2010]; Retrieved from http://www.bostonati.com/products/PI-FOS.pdf.
New River Kinematics, SA ARM—"The Ultimate Measurement Software for Arms, Software Release!", SA Sep. 30, 2010 [On-line], http://www.kinematics.com/news/software-release-sa20100930.html (1 of 14), [Retrieved Apr. 13, 2011 11:40:47 AM].
Optical Circulator (3-Ports & 4-Ports); [on-line technical data sheet]; Alliance Fiber Optic Products, Inc. REV.D Jan. 15, 2004; Retrieved from www.afop.com.
Optical Circulators Improve Bidirectional Fiber Systems; By Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirecti.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2.
Poujouly, Stephane, et al., Digital Laser Range Finder: Phase-Shift Estimation by Undersampling Technique; IEEE, Copyright 1999.
RS Series Remote Controlled Optical Switch; [on-line technical data sheet]; Sercalo Microtechnology, Ltd. [Retrieved Oct. 14, 2010]; Retreived from http://www.sercalo.com/document/PDFs/DataSheets/RS%20datasheet.pdf.
Super-Nyquist Operation of the AD9912 Yields a High RF Output Signal; Analog Devices, Inc., AN-939 Application Note; www.analog.com; Copyright 2007.
Burge, James H., et al, Use of a commerical laser tracker for optical alignment, Proc, of SPIE vol. 6676, Sep. 21, 2007, pp. 66760E-1-6 6760E-12.
Chen, Jihua, et al, Research on the Principle of 5/6-DOF Laser Tracking Metrology, Journal of Astronautic Metrology and Measurement vol. 27, No. 3, May 31, 2007, pp. 58-62.
Newport Company "Fiber Optic Scribes" https://web.archive.org/web/20120903063012/http://www.newport.com/Fiber-Optic-Scribes/835171/1033/info.aspx; 2012, 2 pages.
Newport Corporation "Projects in Fiber Optics: Applications Handbook", 1986; 3 pages.
Takeuchi et al., "Ultraprecision 3D Micromachining of Glass"; Annals of the CIRP; Jan. 4, 1996; vol. 45; 401-404 pages.
Thorlabs "Ruby Dualscribe Fiber Optic Scribe" a Mechanical Drawing, 2014, 1 page.
TOPCON: "IS-3 Imaging Station", www.topconposition.com; 2011; 1-4 pages.

\* cited by examiner

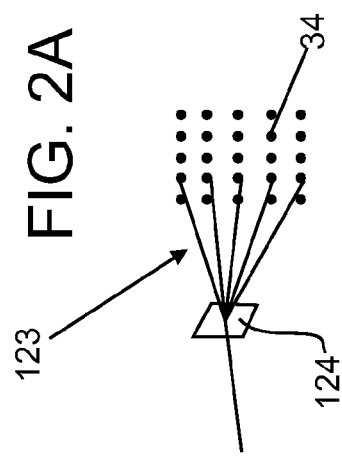
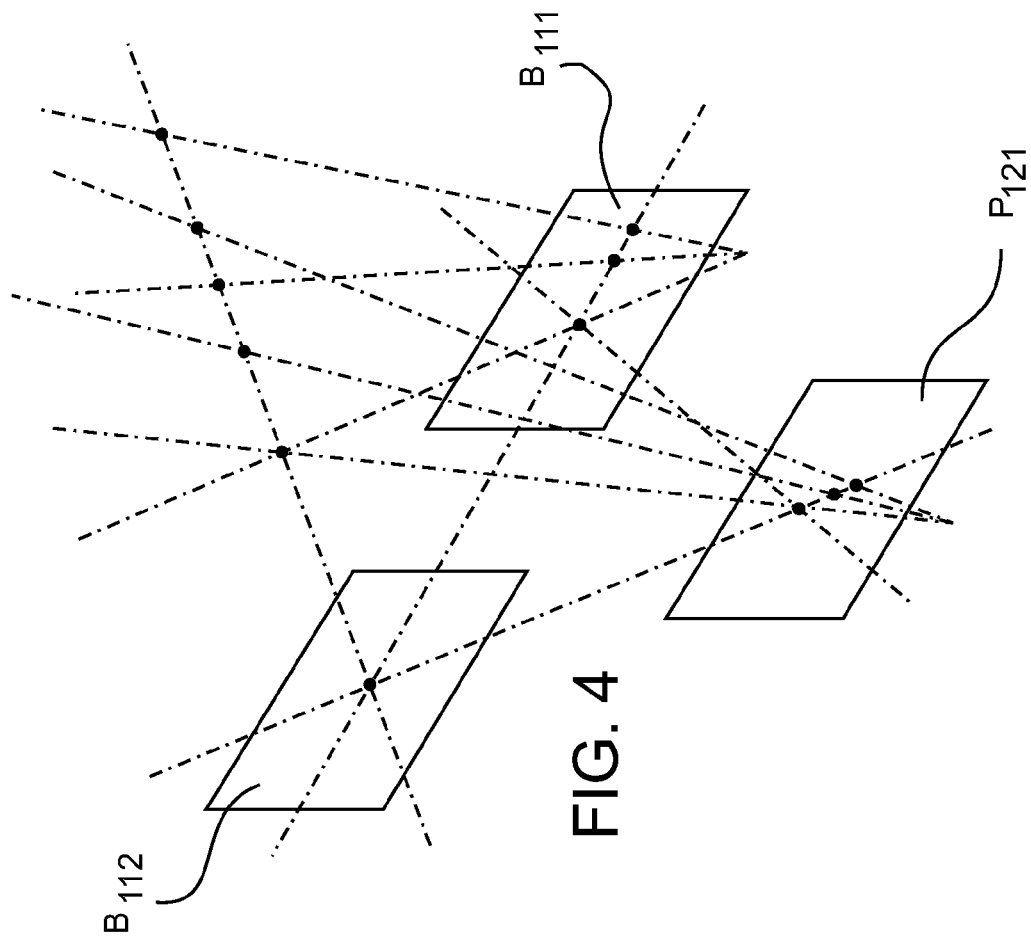
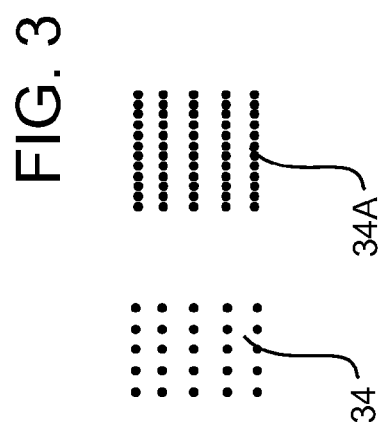

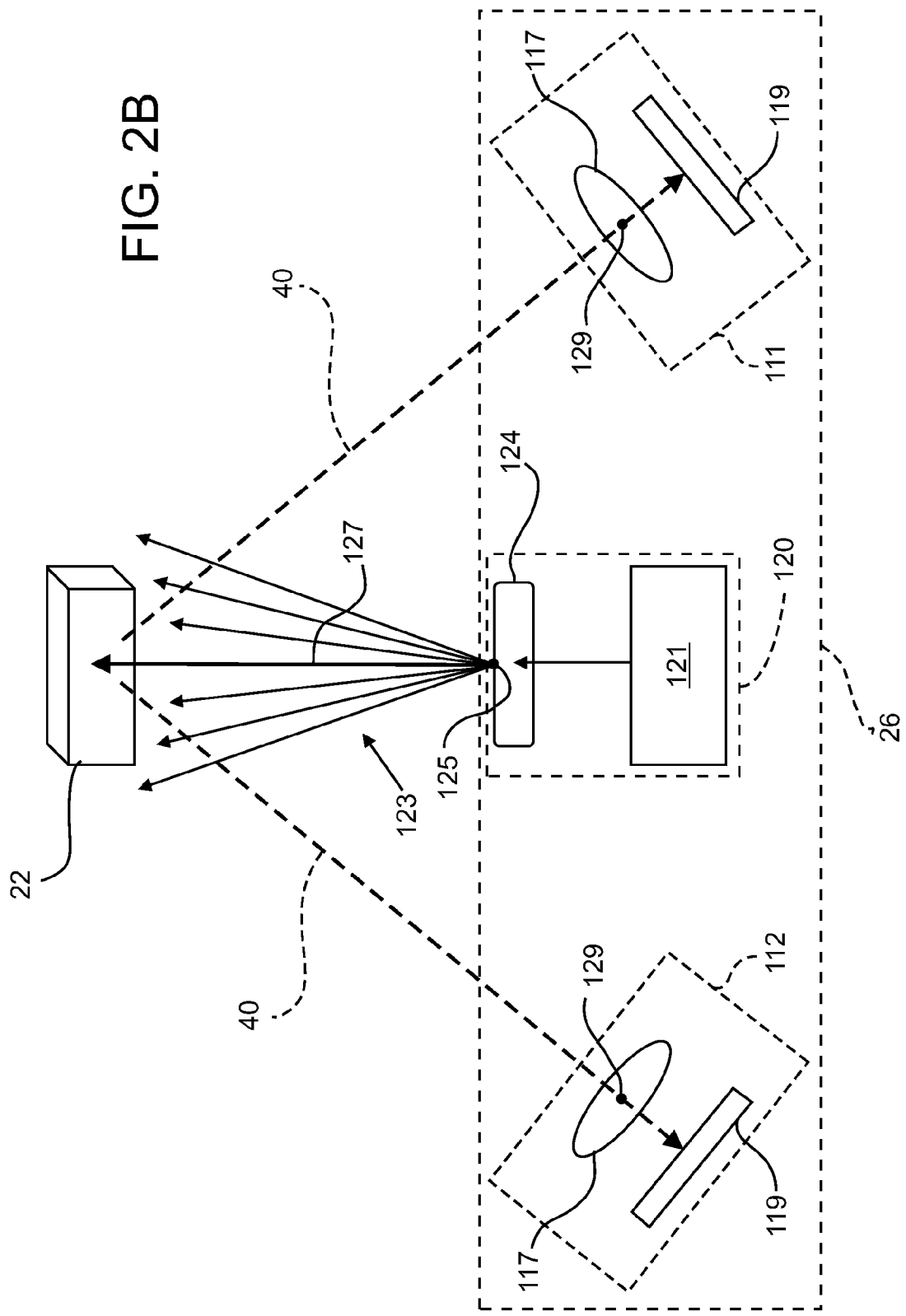

SYSTEM AND METHOD OF ACQUIRING THREE-DIMENSIONAL COORDINATES USING MULTIPLE COORDINATE MEASUREMENT DEVICES

CROSS REFERENCE TO RELATED APPLICATIONS

The Present Application is a continuation-in-part application of U.S. patent application Ser. No. 13/443,946 filed on Apr. 11, 2012, which is a nonprovisional application of U.S. Patent Application Ser. No. 61/592,049 filed on Jan. 30, 2012 and U.S. patent application Ser. No. 61/475,703 filed on Apr. 15, 2011, all of which are incorporated herein by reference in their entirety.

BACKGROUND OF THE INVENTION

The subject matter disclosed herein relates to a system and method of acquiring three-dimensional coordinates of points on a surface of an object and in particular to a system and method of operating a laser tracker in conjunction with a scanner device to track the position and orientation of the scanner device during operation.

The acquisition of three-dimensional coordinates of an object or an environment is known. Various techniques may be used, such as time-of-flight (TOF) or triangulation methods for example. A TOF system such as a laser tracker, for example, directs a beam of light such as a laser beam toward a retroreflector target positioned over a spot to be measured. An absolute distance meter (ADM) is used to determine the distance from the distance meter to the retroreflector based on length of time it takes the light to travel to the spot and return. By moving the retroreflector target over the surface of the object, the coordinates of the object surface may be ascertained. Another example of a TOF system is a laser scanner that measures a distance to a spot on a diffuse surface with an ADM that measures the time for the light to travel to the spot and return. TOF systems have advantages in being accurate, but in some cases may be slower than systems that project a plurality of light spots onto the surface at each instant in time.

In contrast, a triangulation system such as a scanner projects either a line of light (e.g. from a laser line probe) or a pattern of light (e.g. from a structured light) onto the surface. In this system, a camera is coupled to a projector in a fixed mechanical relationship. The light/pattern emitted from the projector is reflected off of the surface and detected by the camera. Since the camera and projector are arranged in a fixed relationship, the distance to the object may be determined from captured images using trigonometric principles. Triangulation systems provide advantages in quickly acquiring coordinate data over large areas.

In some systems, during the scanning process, the scanner acquires, at different times, a series of images of the patterns of light formed on the object surface. These multiple images are then registered relative to each other so that the position and orientation of each image relative to the other images is known. Where the scanner is handheld, various techniques have been used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

Accordingly, while existing coordinate measurement devices are suitable for their intended purposes, the need for improvement remains, particularly in improving the registration of images acquired by a scanner device.

BRIEF DESCRIPTION OF THE INVENTION

According to one aspect of the invention, a method of determining three-dimensional (3D) coordinates of an object surface with a six degree-of-freedom (DOF) laser tracker and a portable structured light scanner is provided. The method comprises providing the scanner having a body, a first camera, a second camera, a first projector, and a processor. The first camera, second camera, and the first projector are coupled to the body, the first camera having a first camera perspective center at a first camera position, the second camera having a second camera perspective center at a second camera position, and the first projector having a first projector perspective center at a first projector position, respectively, in a scanner frame of reference. The first projector position being non-collinear with respect to the first camera position and the second camera position. The first projector configured to produce a first projector pattern of light within the projector and to project the first projector pattern onto the surface as a first surface pattern. The first projector pattern of light being a pattern of light having uniformly spaced elements in each of two dimensions of two-dimensional space. The scanner further having a first retroreflector coupled to the body. The tracker is provided having a tracker frame of reference. The scanner having a first pose in the tracker frame of reference, the first pose including a first location and a first orientation, each of the first location and the first orientation being defined by three degrees of freedom. An emitted beam of light from the tracker is locked onto the first retroreflector. The tracker receives a reflected portion of the emitted beam of light. The tracker measures the first location, the location based at least in part on a first distance, a first angle, and a second angle. The first distance being a distance from the tracker to the retroreflector, the first distance measured with a distance meter, a first angle measured with a first angle measuring device, and a second angle measured with a second angle measuring device. The tracker measures the first orientation. The first surface pattern is projected onto the surface. The first surface pattern is imaged with the first camera to obtain a first image. The first surface pattern is imaged with the second camera to obtain a second image. The processor determines the 3D coordinates of a first plurality of points in the tracker frame of reference based at least in part on the first location, the first orientation, the first projector pattern, the first image, the second image, the first camera position, the second camera position, and the first projector position. The determining of the 3D coordinates being based at least in part on the use of epipolar constraints among the first camera, the second camera, and the first projector. The 3D coordinates are stored.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2A and FIG. 2B are schematic illustrations of the production of a pattern by means of a diffractive optical element used in the scanner of FIG. 1;

FIG. 3 illustrates a first pattern and a second pattern for use with the scanner of FIG. 1;

FIG. 4 is a schematic illustration of a projector plane, an image plane and epipolar lines;

The detailed description explains embodiments of the invention, together with advantages and features, by way of example with reference to the drawings.

DETAILED DESCRIPTION OF THE INVENTION

Embodiments of the present invention provide advantages in registration of images acquired by a scanner device. Embodiments of the invention provide further advantages in the tracking of a handheld scanner device with a coordinate measurement device such as a laser tracker.

Figure 1:
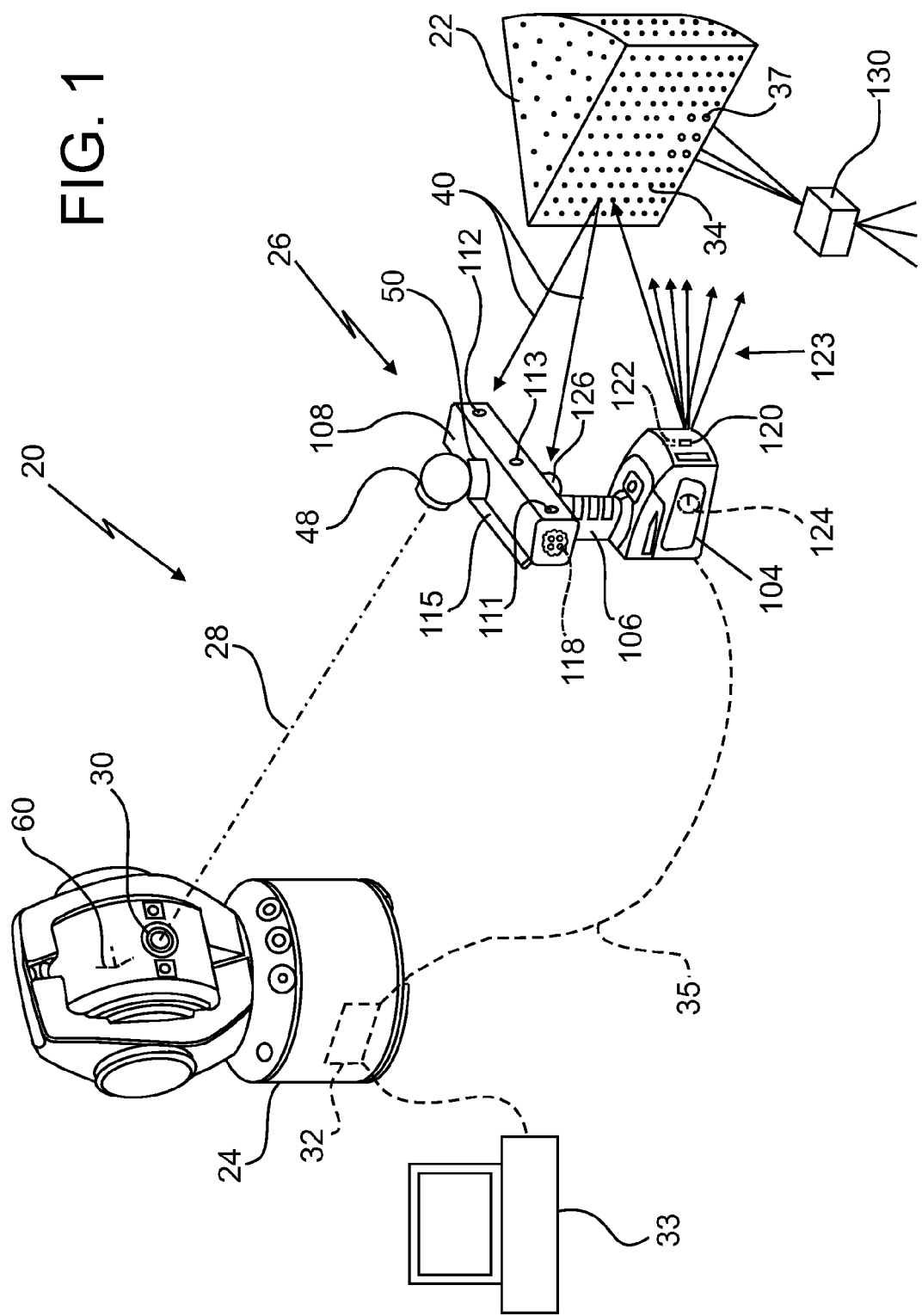
FIG. 1 is a perspective view of a system for measuring an object in accordance with an embodiment of the invention.

Referring to the FIG. 1, a system 20 is shown for measuring the three-dimensional coordinates of an object 22. The system includes a first coordinate measurement device, such as six degree-of-freedom (six-DOF) laser tracker 24 that cooperates with a six-DOF retroreflector. In one embodiment the six-DOF retroreflector may be a six-DOF spherically mounted retroreflector (SMR) 48, attached to a second coordinate measurement device, such as scanner 26.

The laser tracker 24 includes a light source that emits light, for example, a laser, and a distance meter. The light source and distance meter are configured to emit and receive light 28 via an aperture 30. The distance meter may be an absolute distance meter assembly which allows the laser tracker 24 to optically measure the distance between the laser tracker 24 and a six-DOF retroreflector.

In other embodiments, the six-DOF laser tracker 24 may operate with a different type of six-DOF target affixed to the scanner 26. In an embodiment, the six-DOF target includes a cube-corner retroreflector and a collection of light points that are imaged by a camera attached to the tracker. In a further embodiment, the six-DOF tracker works with a type of six-DOF target that includes a glass cube-corner retroreflector prism that has its vertex beveled off to permit light to pass through to a position detector for measurement of pitch and yaw angles of the six-DOF target. This six-DOF target may include a mechanical pendulum that permits low friction rotation with measurement of rotation by an angular encoder attached to the pendulum. Other types of six-DOF targets and six-DOF laser trackers are possible.

The six-DOF laser tracker 24 may include motors, angular encoders and a position detector that allows the laser tracker 24 to track the position of a retroreflector as it is moved through space. Provided within the tracker is a controller 32 having a processor configured to determine the three dimensional coordinates of the retroreflector based at least in part on the distance to the retroreflector and on signals from the angular encoders. In addition, the six-DOF laser tracker includes additional methods for determining the three orientational degrees of freedom (e.g., pitch, roll, and yaw). The methods may include steps of imaging, with a camera coupled to the tracker, points of light adjacent to the retroreflector 48. This camera may have a controlled magnification. The methods may also include a wired or wireless communication to obtain data from a position detector and/or an angular encoder attached to a mechanical pendulum. It should be appreciated that these methods are exemplary and other configurations are possible for a six-DOF laser tracker. The controller 32 may further have additional circuitry, including but not limited to communications circuits which allow the laser tracker 24 to communicate with the scanner 26 or a computer 33 via a wired or wireless communications medium 35.

A scanner 26 is a portable device that allows an operator to optically scan and measure an object or the environment. The scanner 26 has a base part 104, a grip part 106, which protrudes from the base part 104, and a head end 108. An operator of the scanner 26 may hold the scanner 26 at the grip part 106, which is configured to allow the operator to carry the scanner 26 through the environment and to align the scanner 26 to objects 22 in the environment.

In the exemplary embodiment, the scanner 26 is a structured light type of coordinate measurement device. As will be discussed in more detail below, the scanner 26 first emits structured light 123 with a projector 120 to form a structured light pattern 34 on surfaces of object 22. The light pattern 34 is reflected from the surface of object 22 as reflected light 40 and is received by the cameras 111, 112. A lens 117 (FIG. 2B) within each camera 111, 112 images a portion of reflected light 40 onto a corresponding photosensitive array 119 (FIG. 2B) within each camera 111, 112. It should be appreciated that variations in the surface of the object 22 create distortions in the structured pattern when the image of the pattern is captured by the cameras 111, 112. Since the pattern is formed by structured light, it is possible in some instances for a controller 118, or a remote computing device 33 to determine a one to one correspondence between the pixels in the projected pattern and the pixels in the patterns imaged by the cameras 111, 112. The scanner 26 may be a device such as that described in commonly owned U.S. patent application Ser. No. 13/767,167 filed on Feb. 14, 2013, which is incorporated herein by reference.

In the exemplary embodiment, the projector 120 has a diffraction grating 124. The refraction grating 124 has a lens perspective center 125 and a projector optical axis 127. The ray of light from the light source 121 travels from the light source through the refraction grating 124 and through the perspective center 125 to the object 22. Similarly, each camera lens 117 includes a lens perspective center 129 and a lens optical axis. In the embodiment, of FIG. 2B, the lens optical axis is collinear with the illustrated ray of light 40. The ray of light 40 reflects off of the object 22 and travels through the lens perspective center 129 and intercepts the photosensitive array 119. As will be discussed in more detail herein, the determination of 3D coordinates of points on the object 22 will be based at least in part on the use of epipolar constraints among the cameras 111, 112 and the projector 120.

As will be discussed in more detail below, in the exemplary embodiment, a six degree of freedom (6DOF) retroreflector 48 is coupled to the head end 108 along a top surface. The retroreflector 48 may be similar to the one described in commonly owned U.S. patent application Ser. No. 13/370, 339 filed on Feb. 10, 2012 or U.S. patent application Ser. No.

13/407983 filed on Feb. 29, 2012, both of which are incorporated by reference herein in their entirety. In one embodiment, the retroreflector 48 in the form of a six-DOF SMR is coupled to a nest 50. The nest 50 may be a magnetic nest, or may include a clamping arrangement that holds the retroreflector 48 in place during operation. In still other embodiments, one or more the retroreflectors 48 are integrated into the scanner 26. In other embodiments, the scanner 26 may include, in addition to a three DOF retroreflector, three or more points of light mounted on the scanner and viewed by a camera on the six-DOF tracker 24, the combination of retroreflector and lights are sufficient to provide the six degrees of freedom of the scanner 24 within a frame of reference of the tracker 24. In another embodiment, the scanner 26 includes a glass cube-corner retroreflector having the vertex beveled so as to permit light to pass through the retroreflector to a position detector. The position of the transmitted light on the position detector may be used to determine the pitch and yaw angles of the scanner 26. This may be used in combination with a low-friction mechanical pendulum coupled to an angular encoder to determine the roll angle of the scanner 26 with the tracker frame of reference. It should be appreciated that the above described six-DOF targets and trackers are exemplary and not limiting. In other embodiments, other types of six-DOF targets and six-DOF trackers may be used in combination with the scanner 26.

The scanner 26 includes a first camera 111 and a second camera 112 arranged a predetermined distance apart in the head end 108. The first camera 111 and the second camera 112 may be aligned in such a way as to cause the fields of view (FOV) to overlap, thereby providing stereoscopic images of surfaces of object 22. There may be a desired overlap of the camera FOVs that matches, at least approximately, the area of the projected light pattern 34 for a typical distance between the scanner 26 and the object 22. In some embodiments, a typical distance from the scanner 26 to the object 22 may be on the order of several decimeters or a few meters. In an embodiment, the mutual alignment of cameras 111 and 112 is not fixed but can be adjusted by the operator, for example by pivoting the cameras 111, 112 in opposite sense, about axes of rotation that are parallel to the grip 106. Such an adjustment may be followed by a compensation procedure, which may include use of a dot plate, to determine the angles of rotation of the cameras 111, 112.

In the exemplary embodiment, the first camera 111 and the second camera 112 are monochrome, i.e. sensitive to a narrow wavelength range, for example by being provided with filters that pass the desired narrow wavelength range and block other wavelength ranges. The narrow wavelength range passed to the photosensitive arrays 119 within the cameras 111, 112 may be within the infrared range. In order to obtain information on the color of the object 22, a color camera 113 may be arranged in the head end 108. In one embodiment, the color camera 113 may be symmetrically aligned to the first camera 111 and to the second camera 112, and arranged centrally therebetween. The color camera 113 is sensitive in the visible light wavelength range.

The scanner 26 may include a display and control unit 115, such as a touch screen for example. The display and control unit 115 may be arranged at the head end 108, on a side opposite the cameras 111, 112. In one embodiment, the display and control unit 115 may be configured to be detachable. The cameras 111, 112 and, if available, camera 113, as well as the display and control unit 115 are connected to a controller 118, which may also be arranged in the head end 108. The controller 118 can pre-process the data of the cameras 111, 112, 113, to produce the 3D-scans and provide suitable views onto the display and control unit 115. In some embodiments the scanner may not have a display and control unit 115, but rather is operated by means of a remote control, such as portable computer 33 for example, which is in continuous connection (cabled or wireless) with the control and evaluation unit 118, such as through medium 35 for example.

It should be appreciated that unless the controller 118 transfers the 3D-scans or the data of the cameras 111, 112, 113, by means of wireless medium 35, the scanner 26 may be provided with a data connection, such as on the base part 104 for example. The data connection can be, for example, a standardized interface for LAN, USB or the like. If appropriate, the data connection can be configured also for introducing a portable storage medium (SD-card, USB-stick etc.). For power supply, a battery may be provided in the base part 104. For charging the battery, a power supply outlet may be provided, preferably on the base part 104. In another embodiment, the battery may be replaced by the user when depleted.

In an embodiment, a first projector 120 is provided in the base part 104. The first projector 120 is aligned in correspondence with the two cameras 111, 112. The relative distance and the relative alignment are pre-set or may be set by the user. The first projector 120 projects the structured light pattern 34 onto the object 22 being scanned.

As used herein, the term "structured light" refers to a two-dimensional pattern of light projected onto a continuous area of an object that conveys information which may be used to determine coordinates of points on the object. A structured light pattern will contain at least three non-collinear pattern elements. Each of the three non-collinear pattern elements conveys information which may be used to determine the point coordinates.

In general, there are two types of structured light patterns, a coded light pattern and an uncoded light pattern. In a coded light pattern, the set of elements are arranged identifiable elements such as collections of lines or pattern regions. In contrast, an uncoded structured light pattern may include a pattern in which the elements are identical and uniformly spaced, such as a pattern of dots or other geometric shapes.

In the exemplary embodiment, the pattern 34 is an uncoded pattern, for example, a periodic pattern. A similarity in the appearance of the periodic pattern elements is resolved by the use of the two cameras 111, 112 together with a projector 120 located at a position not collinear with the two cameras. With this arrangement, epipolar constraints and related mathematical methods may be used to establish the correspondence between periodic elements projected by the projector 120 and the periodic elements observed by the cameras 111, 112. The uncoded pattern 34 may be a point pattern, comprising a regular arrangement of points in a grid. For example, in one embodiment, the uncoded pattern consists of a 100×100 array of points that are projected at an angle of approximately 50° to a distance between 0.5 m to 5 m. The pattern 34 can also be a line pattern or a combined pattern of points and lines, each of which is formed by light points. Lenses 117 in the two cameras 111 and 112 form images of the pattern 34 in their respective image planes B111 and B112 (FIG. 4) located on photosensitive arrays 119 (for example, a CMOS or CCD type sensor) to record the pattern 34.

The resolution in the 3D coordinates obtained for the object 22 may depend on the distance from the scanner 26 to the object 22. For example, fine structures of the object 22, a relatively high point density may be used, while a relatively low point density may be sufficient to resolve coarse structures. It therefore it may be advantageous to produce, in addition to pattern 34, at least one other pattern 34A (FIG. 3). Suitable patterns 34, 34A may be dynamically selected to measure the coarse and fine structures of the object 22.

In one embodiment a second projector 122 may be provided. The second projector 122 may be aligned to produce the second pattern 34A. In another embodiment, the first projector 120 may produce, in addition to pattern 34, the second pattern 34A, where the patterns 34, 34A are offset to each other with respect to time or in another wavelength range. The second pattern 34A may be a pattern different from pattern 34, obtained for example by changing the distance between the points (grid pitch).

In an embodiment, the second pattern 34A overlays the first pattern 34, for example, with a different intensity. A combined pattern may include a first set of light points 34 spaced farther apart but with higher intensity and a second set of light points 34A spaced closer together but with lower intensity. With the combined pattern having spots of differing intensities, it is in some cases possible to overcome issues with different levels of reflected light by properly selecting the exposure times or projected optical power levels.

It is also contemplated that more than two patterns 34, 34A may be used. For example, a defined sequence of differing patterns may be projected over time.

In one embodiment, the monochromatic first pattern 34 (and second pattern 34A) is produced by means of a diffractive optical element 124 (FIG. 1-2), which divides a light beam produced by a laser in the wavelength range (infrared) of the two cameras 111, 112 in correspondence with the first pattern 34, without losing a significant amount of optical power. In the exemplary embodiment, the diffractive optical element 124 is arranged in front of the light source 121 within a projector 120 (FIG. 2B). In this instance, the lateral resolution is then determined by the size of the projected points. It is possible to record the images of the color camera 113 and images of the infrared spots on the cameras 111, 112 without interference of the patterns received by the cameras. The first pattern 34 (and the second pattern 34A) could in other embodiments be produced in the ultraviolet range.

Two patterns 34, 34A may be produced with two diffractive optical elements, which are produced at different times or illuminated with different wavelengths. With a time-variable diffractive optical element, it is possible to quickly (i.e. with approximately each frame) or slowly (for example manually controlled) change between the patterns 34, 34A, or first pattern 34 may be adapted dynamically to the changing facts or situation (with regard to the density of the light points on the object surface and the reach of the projected first pattern 34). A gradual transition between the patterns 34, 34A is conceivable as well (fade-over). As an alternative to diffractive optical elements, arrays of microlenses or of single lasers can be used. Optionally, also a classical imaging by means of a mask, in particular of a transparency, is possible.

In one embodiment, to improve energy efficiency, the first projector 120 may be configured to produce the first pattern 34 on the objects 22 when the cameras 111, 112 (and if available camera 113) record images of the objects 22 which are provided with the first pattern 34. For this purpose, the two cameras 111, 112 and the projector 120 (and if available the second projector 122) are synchronized, such as coordinated internally with each other for example, with regard to both time and the first pattern 34 (and optionally second pattern 34A). Each recording process starts by the first projector 120 producing the first pattern 34, similar to a flash in photography, and the cameras 111, 112 (and, if available camera 113) following with their records, more precisely their pairs of records (frames), such as one image each from each of the two cameras 111, 112. The recording process can comprise one single frame (shot), or a sequence of a plurality of frames (video). A trigger switch 126, by means of which such a shot or such a video can be triggered, is provided on the grip part 106. After processing of the data, each frame then constitutes a 3D-scan, i.e. a point cloud in the three-dimensional space, in relative coordinates of the scanner 26. In another embodiment, the recording process may be triggered by means of a remote control of the scanner 26. As will be discussed in more detail below, the plurality of frames may be registered relative to each other in space using coordinate data acquired by the tracker 24.

The first projector 120 and the second projector 122 may be arranged in a non-collinear position relative to the one camera 111 or two cameras 111, 112. In one embodiment, the projectors 120, 122 and the one camera 111 or two cameras 111, 112 are positioned in a triangular arrangement. This arrangement of the two cameras 111, 112, as well as of the first projector 120 (and optionally of the second projector 122) makes use of mathematical methods of optics, which are known in the art, as epipolar geometry, according to which one point in the image plane B112 of the second camera 112 can be observed on a (known) epipolar line, in the image plane B111 of the first camera 111, and vice versa, and/or a point which is produced by the first projector 120 from a projector level P121 can be observed on one epipolar line each, in the image planes B111, B112 of the two cameras 111, 112.

In the exemplary embodiment, at least three units (projector 120 and the two cameras 111, 112) are involved, i.e. proceeding from each of the units, two stereo geometries each (with a plurality of epipolar lines each) can be defined with the two other units. Unambiguous triangle relations of points and epipolar lines, from which the correspondence of projections of the first pattern 34 (and optionally second pattern 34A) in the two image levels B111, B112 can be determined, as a result of this arrangement. Due to the additional stereo geometry (compared to a pair of cameras), considerably more of the points of the pattern, which otherwise could not be distinguished, may be identified on a given epipolar line. It should be appreciated that this allows for the identification of the points in an uncoded structured light pattern. The density of features may thus simultaneously be high, and the size of the feature can be kept very low. This provides advantages over other structured light devices that use encoded patterns (having features consisting, for example, of a plurality of points), where the size of the feature has a lower limit, limiting the lateral resolution. If the correspondence has been determined, the three-dimensional coordinates of the points on the surface of the object 22 are determined for the 3D-scan by means of triangulation.

Additional three-dimensional data may be gained by means of photogrammetry from several frames with different camera positions, for example from the color camera 113 or from the part of the signal of the cameras 111, 112, which comes from the ambient light. It can also be advantageous, if the scanner 26 or another unit (not shown) illuminates the object 22 and optionally the background, with white light or infrared light for example. This allows for not only the parts of the object 22 (also illuminated by the pattern 34) and background to be visible, but also areas in between. Such illumination may be desirable if the data of the color camera 113 is used for making the 3D-scans (and not only for the coloration thereof), and for calibrating the cameras 111, 112, if filters are used are used to allow the capture of only a limited spectral range.

The scanning process also shows an aspect of time. Whereas, with stationary devices, a whole sequence of patterns may be projected and images be recorded in order to determine one single 3D-scan, one 3D-scan is produced with each shot of the scanner 26 in the embodiments. In one embodiment, if a second projector 122 or a further diffractive optical element 124 or at least a second pattern 34A in addition to first pattern 34 is provided, it is possible to also record, with one shot, images with different patterns 34, 34A consecutively, so that the 3D-scan will provide a higher resolution.

In order to capture the complete scene, the 3D-scans which are produced with the shot need to be registered, meaning that the three-dimensional point clouds of each frame are inserted into a common coordinate system. Registration may be possible, for example, by videogrammetry, such as by using "structure from motion" (SFM) or "simultaneous localization and mapping" (SLAM) techniques for example. The features, such as edges and corners for example, of the objects 22 may be used for common points of reference, or a stationary pattern 37 may be produced. The natural texture and features of objects may be captured by the color camera 113 and may also provide common points of reference.

In one embodiment, a separate projector 130 shown in FIG. 1 projects a stationary pattern 37 onto the objects 22 to be scanned, which might be a pattern similar to first pattern 34 or second pattern 34A or may be a different pattern—for example, of a more complex and easily recognizable pattern. While first pattern 34 and optionally second pattern 34A moves with the scanner 26, the pattern 37 remains stationary. Thus, if the scanner 26 is moved and images are acquired by the scanner 26 from different positions, the images may be registered to a common coordinate system based on the stationary pattern 37. The stationary pattern 37 is then visible in a plurality of images (frames) of the cameras 111, 112, so that the 3D-scans determined thereof can be registered by means of the stationary pattern 37. In an embodiment, the stationary pattern 37 differs from patterns 34, 34A with regard to geometry or time or spectrum (or a combination thereof). If it differs with regard to time, the stationary pattern 37 is produced at least in intervals of time, in which the first pattern 34 and optionally second pattern 34A are not produced (alternating or overlapping). If the stationary pattern 37 differs with regard to spectrum, the stationary pattern 37 is within another wavelength range as first pattern 34 and optionally second pattern 34A, so that the cameras 111, 112 are configured to be sensitive for this wavelength, such as through the use of corresponding filters. The separate projector 130 may be synchronized with the scanner 26, such that the time and kind of the projected stationary pattern 37 are known to the scanner 26.

Another method for registration is provided by measuring the six degrees of freedom (DOF) of the scanner 26 with a six-DOF laser tracker 24 and a six-DOF target or targets. There are many types of six-DOF laser trackers and six-DOF targets that may be used, and any of these will suit the purpose described below. In an embodiment, the six DOF target 48 is a six-DOF retroreflector, which may be a glass cube-corner retroreflector having edges that are darkened so that a camera internal to the tracker 24 can image the lines. The images of these lines may be analyzed to determine the orientation of the retroreflector. The tracker measures the three DOF associated with the x, y, z position of the retroreflector so that, combined with the orientation of the retroreflector, six degrees of freedom are obtained. In the embodiment depicted in FIG. 1, a six-DOF glass retroreflector target is incorporated within a metal sphere to obtain a six-DOF spherically mounted retroreflector (SMR) 48. In some embodiments, the six-DOF SMR is placed in a magnetic nest 50 and rotated into a desired position. In some embodiments, the six-DOF SMR 48 is rotated into position and then fixed in placed with a clamp (not shown). A potential advantage of using a six-DOF SMR 48 placed in a magnetic nest is that the SMR may be conveniently rotated into the line of sight of the laser tracker as the scanner 26 is moved around the object 22 to scan the object from all directions. The six-DOF retroreflector 48 is tracked by the six-DOF laser tracker to determine the six degrees of freedom of the scanner 26. This information may be used to convert the three-dimensional coordinates of the object surface 22 measured by the scanner within its local frame of reference to be converted into a global frame of reference. This is accomplished using methods from matrix mathematics that are well understood in the art and will not be described further herein. As the scanner is moved, its position may be continually recalculated. To register the images acquired by the scanner 26 with the position and orientation data acquired by the laser tracker 24, the operation of the scanner 26 may be synchronized with the tracker measurements. In one embodiment, the scanner 26 is coupled for communication to the laser tracker 24 via a wired or wireless communications medium 35. In one embodiment, the communication between the scanner 26 and the laser tracker 24 is optical. The controller 118 of scanner 26 may transmit a trigger signal to the laser tracker 24 via medium 35. The trigger signal may be initiated by the operation (e.g. closing of the shutter) of the cameras 111, 112 for example. It should be appreciated that the direction of the trigger signal may also reversed and transmitted to the scanner 26 from the laser tracker 24 (or another third device) in response to the scanner 26 being positioned in a desired location and orientation.

It should still further be appreciated that the synchronization may be realized by other methods than the transmitting of a signal. In one embodiment, the laser tracker 24 and the scanner 26 have a common clock. In this embodiment, the acquisition time for the image and coordinate data are recorded. The time data may then be used to determine a correspondence between the image and coordinate data to register the images. In one embodiment, the clocks of the laser tracker 24 and scanner 26 a synchronized using the Institute of Electrical and Electronics Engineers (IEEE) standard 1588. In still another embodiment, the operation of the laser tracker 24 and the scanner 26 may be synchronized using polling.

In one embodiment, the registration of the images obtained by the scanner 26 using a combination of the position and orientation data from laser tracker 24 and videogrammetry via the pattern 37 projected by projector 130. This embodiment may provide advantages in verifying that results are self-consistent and that the fixtures mounting the object 22 are stable.

In still other embodiments, movement of the scanner 26 may be automated, such as by mounting the scanner 26 to a manually movable trolley (or on another cart), or on an autonomously moving robot for example. The scanner 26, which is no longer carried by the user, scans its environment in a more defined manner, rather by producing a video than by producing a sequence of discrete images.

Figure 5:
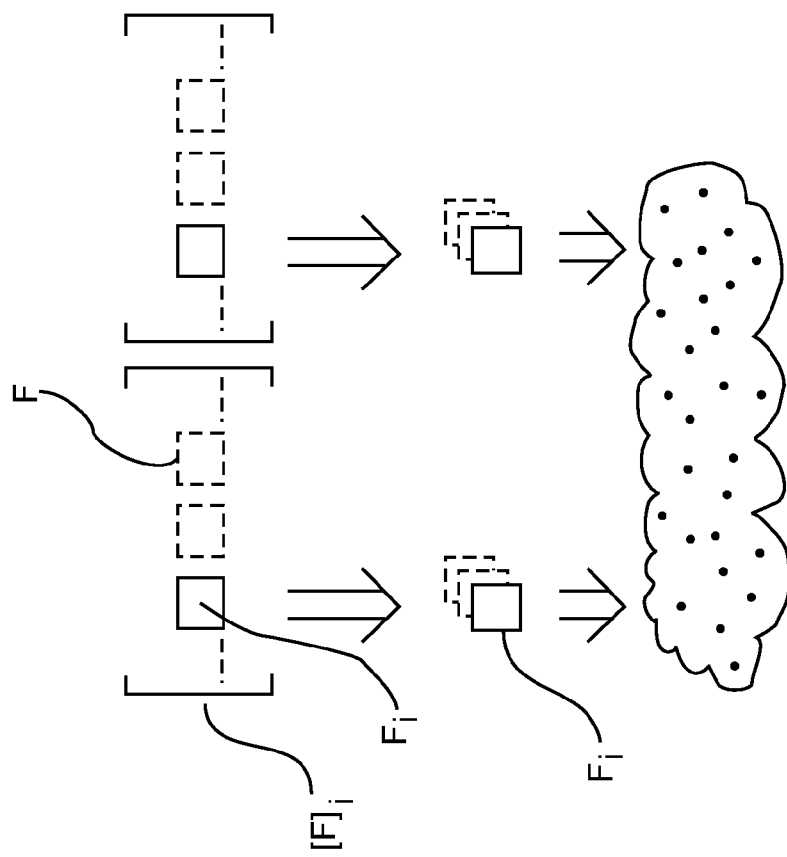
FIG. 5 is a schematic illustration of an averaging process.

The scanner 26 may be configured to produce a video with a high rate of image frames, such as seventy frames per second for example. Since the scanner 26 only moves a short distance between any two adjacent frames, the video will contain redundant information, in other words the two frames which are adjacent with regard to time will differ only very slightly spatially. In order to reduce the amount of data to be saved and/or to be transferred, suitable averaging procedure such as that shown in FIG. 5 may be used in post-processing. In a first averaging step, the frames F are divided into groups [F]i, with a plurality of frames per group [F]i around one key frame Fi each.

A group [F]i of substantially overlapping frames F, single measuring points may be efficiently stored in a common two-dimensional data structure (grid structure), such as a threshold related to surface data and similar to a two-dimensional image for example. The smaller storage capacity used by the data structure permits the scanner 26 to initially save all captured measured values as a vector in the two-dimensional data structure, i.e. gray-tone value/color and distance from the scanner 26 for each of the pixels of the frames F of the group [F]i.

In a second averaging step, an averaging takes place within each group [F]i, in order remove erroneous measurements. For such averaging (with regard to gray tones/colors and/or distances), a defined part of the vector within the central range of the sorted measured values is taken. The central range can be distinguished by means of threshold values. Such averaging corresponds to a replacement of the group [F]i by a key frame Fi with averaged measured values, wherein the key frames Fi still overlap. Each measuring point which is gained is then carried on as a point (corresponding to a three-dimensional vector) of the three-dimensional overall point cloud.

In an optional third step, the measuring points gained by averaging can be brought together with data from another group [F]i, for example by Cartesian averaging.

Figure 6:
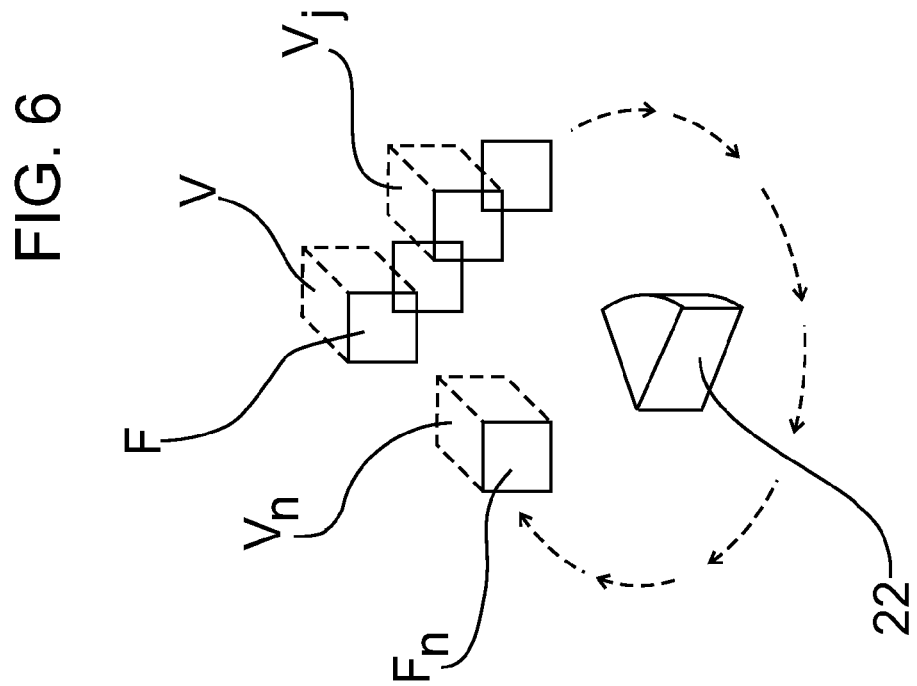
FIG. 6 is a schematic illustration of a ring closure process.

When an object 22 is circumnavigated by the scanner 26, a ring closure may occur, meaning that the scanner 26 is moved about the object 22 until the video (or the sequence of shots) shows the same or similar view to the first image. The ring closures could be recognized immediately, if it were possible to look at all available data, at any time during the production of the overall point cloud. However, the amount of data and the computing time to perform the operations do not typically allow for such immediate recognition of the ring closure. In one embodiment a method is provided which allows for the rapid determination of a ring closure. In this embodiment, if all measurements are error free, the ring closure may quickly result from the registration of the 3D-scan in the common coordinate system. However, in a typical scanning operation an error may occur resulting in an offset of two similar frames F. An embodiment for automatically recognizing the ring closure shown in FIG. 6 that corrects for such errors.

A frustum, or more precisely a viewing frustum, is usually a truncated-pyramid-shaped area of space, which extends from the image plane, in correspondence with the viewing direction, into the infinite. In the present invention, a frustum V is formed for each frame in a first step, such frustum comprising (at least approximately) 80% of the captured points from the three-dimensional point cloud, i.e. a finite part of said area of space of the assigned 3D scan, which is determined from the frame F. The latest frustum Vn is assigned to the latest frame Fn. In a second step, the latest frustum Vn is then compared to the past frusta V by forming the intersection. The frustum out of a previous frusta Vj, with which there is the largest intersection, is selected for carrying out an analysis.

In a third step, within the latest frustum Vn and the selected frustum Vj each, features are evaluated, such as edges and corners for example, in a known manner In a fourth step, the detected features are compared to each other, for example with regard to their embedded geometry, and the coinciding features are identified. Depending on the degree of coincidence, it is determined in a fifth step, whether there is a ring closure or not.

In this method, common features are generated from the identified, coinciding features. Using a "bundle adjustment" technique, the error of measurement may be corrected in a sixth step, such as the 3D scans are corrected up to a defined depth of penetration into space for example, or the three-dimensional point cloud is in some places and to a certain degree displaced, so that the offset is eliminated in the frames, 3D scans and frusta which are substantially identical. If correction is not completely possible, after the sixth step (with the "bundle adjustment"), a certain deviation of data and consequently a certain error of measurement which is not corrected, still remains, this certain deviation (i.e. the error which cannot be corrected) may be used as a measure for the quality of the measurements and of the data as a whole.

The movement of the scanner 26 and the image frames may also be processed by a method of image tracking, in other words the scanner 26 tracks the relative movement of its environment using the images acquired by a camera, such as camera 113 for example. If image tracking gets lost, such as when the scanner 26 is moved too fast for example, there is a simple possibility of resuming image tracking. For this purpose, the latest video image, as it is provided by the camera, and the last video still image from tracking provided by it, are represented side by side (or one above the other) on the display and control unit 115 for the operator. The operator may then move the scanner 26 until the two images coincide.

It should be appreciated that the method of registering the images via the ring closure and image tracking methods may also be combined with the tracking of the scanner 26 by the six-DOF laser tracker 24. In an embodiment, the laser tracker 24 may determine the position and orientation of the scanner 26 until the scanner 26 is at a position or angle where the light beam 26 is not reflected back to the aperture 30. Once this occurs, the registration of images switches from using the laser tracker 24 coordinate data to a secondary method, such as image tracking for example. Using the combined methods of registration provides advantages in avoiding having to move the laser tracker 24 to scan the opposite side of the object 22.

Figure 7:
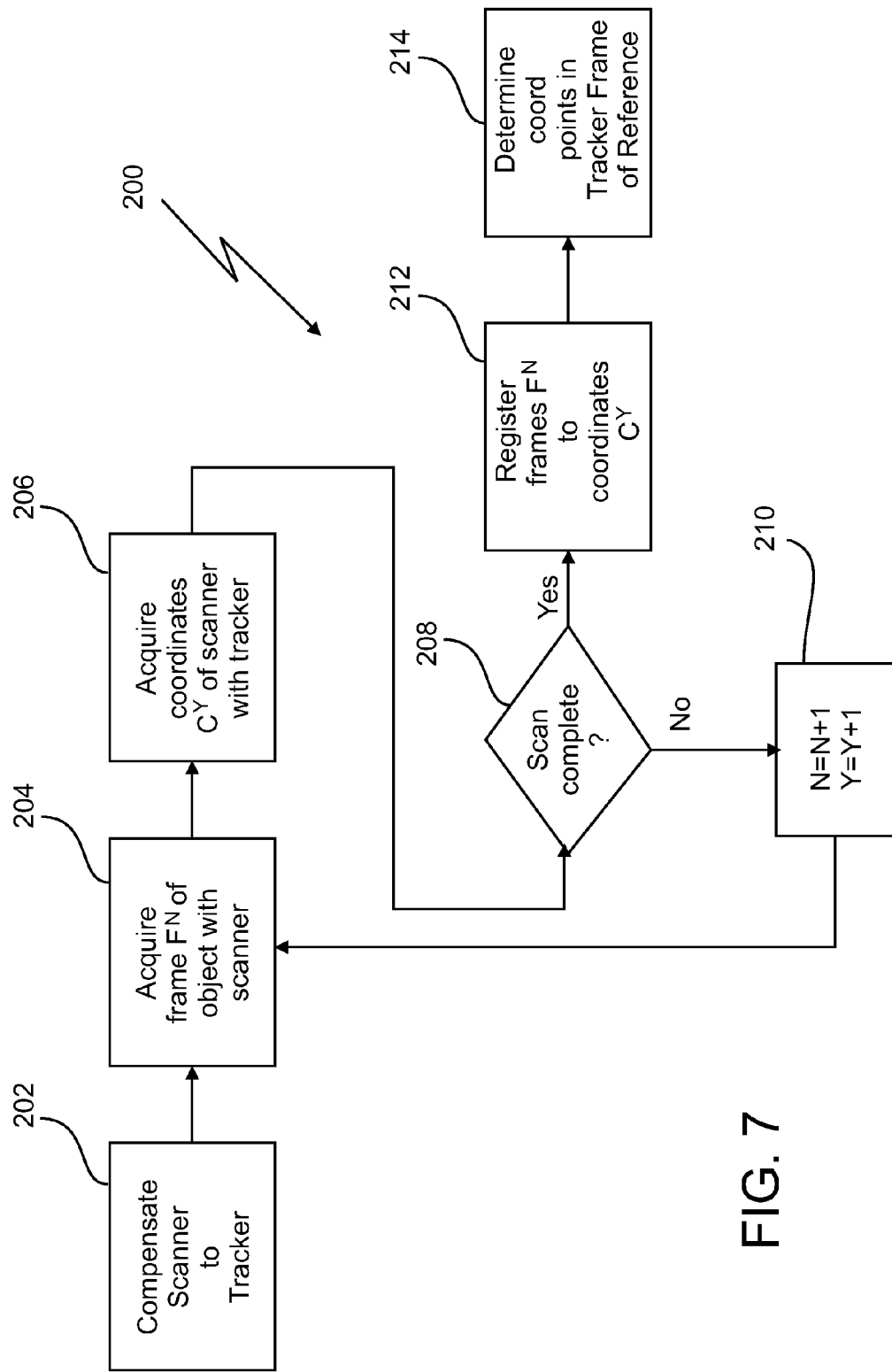
FIG. 7 is a flow diagram illustrating the operation of the system of FIG. 1.

Referring now to FIG. 7, a method 200 is shown for scanning an object 22 using a laser tracker 24 and a scanner 26. The method 200 begins with compensating the scanner 26 to the tracker 24 in block 202 to enable the tracker to accurately determine the six DOF of the scanner in the tracker frame of reference. In block 202, a compensation procedure will be carried out in which compensation parameters are determined for the particular situation or application. For the case of a six-DOF tracker measuring a six-DOF retroreflector having lines at the intersections of the reflecting planes of a cube corner, the parameters would include a position and orientation of the scanner in relation to a frame of reference of the scanner. The method 200 then proceeds to block 204 where the scanner 26 acquires a first image $F^1$ of the object 22. The acquisition of the image may be in response to the operator actuating a switch 126 for example. The method 200 then acquires the coordinates $C^1$ of the scanner 26 with the laser tracker 24 in block 206. It should be appreciated that the coordinate data set $C^Y$ includes not only position data (X, Y, Z or a translational set of coordinates), but also orientation data (orientational set of coordinates) of the scanner 26. The position and orientation data of the scanner 26 define a pose of the scanner 26 in the scanner frame of reference. There will be a pose (position and orientation) of the scanner 26 for each image $F^N$ acquired. The method 200 may trigger the acquisition of the scanner coordinates by the laser tracker via a signal transmitted over medium 35, for example, or data may be automatically acquired at predetermined intervals, for example, by polling.

Next, the query block 208 determines if the scanning of the object 22 is completed. In an embodiment, if the query block 208 returns a negative value, the method 200 proceeds to block 210 where the indexing variables are incremented and the method 200 loops back to block 204 where the image frames ($F^2$, $F^3$ . . . $F^N$) and block 206 where the coordinates ($C^2$, $C^3$ . . . $C^Y$) are acquired. This continues until the scanning of the object 22 desired by the operator is completed.

Once the scan is completed, the query block 208 returns a positive value and proceeds to block 212 where the image frames $F^N$ and the coordinates $C^Y$ are registered to each other. Finally, in block 214 the coordinates of the points on the object 22 are determined in the laser tracker 24 frame of reference.

Figure 8:
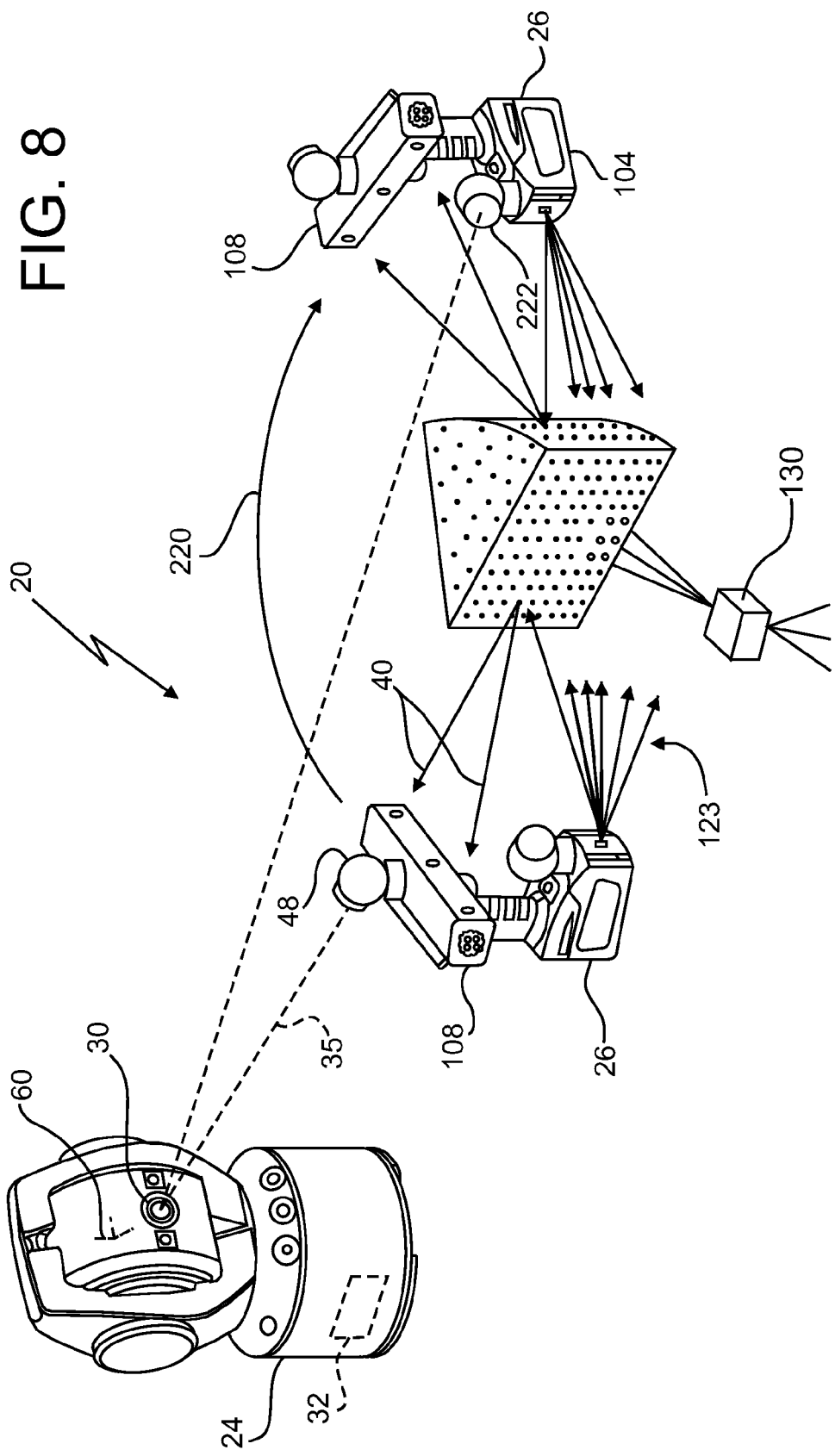
FIG. 8 is a perspective view of a system for measuring an object in accordance with another embodiment of the invention.

Referring now to FIG. 8, another embodiment of the system 20 is shown having a laser tracker 24 that is used in combination with a scanner 26. In this embodiment, the scanner 26 includes a first 6DOF retroreflector 48 coupled to the head end 108. The retroreflector 48 is configured to receive and reflect an incoming beam of light 35 that is approaching from the side of the scanner 26 where the user interface is located, in other words the rear of the scanner 26. It should be appreciated that as the scanner 26 is moved, as indicated by the arrow 220, the angle of the incoming beam of light 35 will increase until the retroreflector 48 can not reflect the light back towards the aperture 30. Typically, this transition point occurs at angle of 90 to 95 degrees from normal. It should further be appreciated that once the retroreflector 48 is not reflecting light back to the laser tracker 24, the laser tracker 24 will no longer be able to determine the location of the scanner 26.

In this embodiment, the scanner 26 also includes a second 6DOF retroreflector 222. The second retroreflector 222 is mounted to the scanner 26 with its reflective elements configured to reflect light that in incoming from a direction substantially opposite from that of the first retroreflector 48. In other words, the second retroreflector 222 is configured to reflect light that is traveling towards the front of the scanner 26. In one embodiment, the second retroreflector is mounted to the base 104. Is should be appreciated that while the retroreflectors 48, 222 are illustrated in the embodiments as being arranged on the head end 108 or the base 104, this is for exemplary purposes and the claimed invention should not be so limited. In other embodiments, the retroreflectors 48, 222 may be mounted on other areas of the scanner 26 or on the same area of the scanner 26. In some embodiments, the scanner 26 may have additional retroreflectors, such as four retroreflectors for example, that each are oriented to direct light from different directions. Such six-DOF retroreflectors 48, 222 may be rotated by toward the six-DOF laser trackers if the SMRs are held in magnetic nests. However, such rotation may not be possible if the SMRs are clamped in place. The six-DOF retroreflectors may also be glass cube corners directly embedded into the scanner and held stationary. Of course, as discussed hereinabove, other types of six-DOF targets may be used with laser trackers, some which involve illuminated markers in addition to a retroreflector, and some which require active (electrically powered) retroreflective targets.

It should be appreciated that since the retroreflectors 48, 222 are arranged in a fixed geometric relationship, the laser tracker 24 will be able to determine the relative positions of the retroreflectors 48, 222 to each other at any point in time. Therefore, as the scanner 26 approaches a point in space where the laser tracker 24 will switch from one retroreflector to the other retroreflector, the laser tracker 24 will be able to automatically reposition and redirect the beam of light 28 onto the desired retroreflector.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of determining three-dimensional (3D) coordinates of an object surface with a six degree-of-freedom (DOF) laser tracker and a portable structured light scanner, the method comprising:

providing the scanner having a body, a first camera, a second camera, a first projector, and a processor, the first camera, the second camera, and the first projector coupled to the body, the first camera having a first camera perspective center at a first camera position, the second camera having a second camera perspective center at a second camera position, and the first projector having a first projector perspective center at a first projector position, respectively, in a scanner frame of reference, the first projector position being noncollinear with respect to the first camera position and the second camera position, the first projector configured to produce a first projector pattern of light within the projector and to project the first projector pattern onto the surface as a first surface pattern, the first projector pattern of light being a pattern of light having uniformly spaced elements in each of two dimensions of two-dimensional space, the scanner further having a first retroreflector coupled to the body;

providing the tracker having a tracker frame of reference, the scanner having a first pose in the tracker frame of reference, the first pose including a first location and a first orientation, each of the first location and the first orientation being defined by three degrees of freedom;

locking an emitted beam of light from the tracker onto the first retroreflector;

receiving by the tracker a reflected portion of the emitted beam of light;

measuring with the tracker the first location, the location based at least in part on a first distance, a first angle, and a second angle, the first distance being a distance from the tracker to the retroreflector, the first distance measured with a distance meter, a first angle measured with a first angle measuring device, and a second angle measured with a second angle measuring device;

measuring with the tracker the first orientation;

projecting onto the surface the first surface pattern;

imaging the first surface pattern with the first camera to obtain a first image;

imaging the first surface pattern with the second camera to obtain a second image;

determining with the processor the 3D coordinates of a first plurality of points in the tracker frame of reference based at least in part on the first location, the first orientation, the first projector pattern, the first image, the second image, the first camera position, the second camera position, and the first projector position, the determining based at least in part on the use of epipolar constraints among the first camera, the second camera, and the first projector; and storing the 3D coordinates.

2. The method of claim 1 further comprising:

moving the scanner to a second pose that includes a second location and a second orientation;

locking the emitted beam of light from the tracker onto the first retroreflector;

receiving by the tracker the reflected portion of the emitted beam of light;

measuring with the tracker the second location;

measuring with the tracker the second orientation;

projecting onto the surface a second surface pattern;

imaging the second surface pattern with the first camera to obtain a third image;

imaging the second surface pattern with the second camera to obtain a fourth image; and determining with the processor the 3D coordinates of a second plurality of points in the tracker frame of reference based at least in part on the second location, the second orientation, the third image, the fourth image, and the first projector position.

3. The method of claim 1 further comprising synchronizing acquiring of the first image, the acquiring of the second image, the acquiring of the first location, and the acquiring of the first orientation, the synchronizing based at least in part on a trigger signal shared by the scanner and the tracker.

4. The method of claim 1 wherein, in the step of providing the scanner, the scanner further has a second retroreflector coupled the body, the second retroreflector being oriented in a different direction than the first retroreflector.

5. The method of claim 1 wherein, in the step of providing the scanner, the first retroreflector is configured to be rotated with respect to the body.

6. The method of claim 5 wherein, in the step of providing the scanner, the first retroreflector is further configured to be rotated within a magnetic nest.

7. The method of claim 5 wherein, in the step of providing the scanner, the first retroreflector is a spherically mounted retroreflector.

8. The method of claim 1 wherein, in the step of projecting the first surface pattern onto the surface, the first surface pattern is a first pattern of dots.

* * * * *